US009945458B2

(12) United States Patent
Klassen

(10) Patent No.: US 9,945,458 B2
(45) Date of Patent: Apr. 17, 2018

(54) ACTUATOR USING EXPANSION OR CONTRACTION TO PRODUCE LINEAR OR ROTARY MOTION

(71) Applicant: Genesis Robotics LLP, Langley (CA)

(72) Inventor: James Brent Klassen, Langley (CA)

(73) Assignee: Genesis Robotics LLP, Langley (CA)

( * ) Notice: Subject to any disclaimer, the term of this patent is extended or adjusted under 35 U.S.C. 154(b) by 526 days.

(21) Appl. No.: 14/409,973

(22) PCT Filed: Jun. 19, 2013

(86) PCT No.: PCT/CA2013/050472
§ 371 (c)(1),
(2) Date: Dec. 19, 2014

(87) PCT Pub. No.: WO2013/188976
PCT Pub. Date: Dec. 27, 2013

(65) Prior Publication Data
US 2015/0198222 A1   Jul. 16, 2015

Related U.S. Application Data

(60) Provisional application No. 61/661,802, filed on Jun. 19, 2012.

(51) Int. Cl.
*H02N 2/02* (2006.01)
*F16H 19/08* (2006.01)
(Continued)

(52) U.S. Cl.
CPC ............ *F16H 19/08* (2013.01); *F16H 13/12* (2013.01); *F16H 49/001* (2013.01); *H02N 1/00* (2013.01);
(Continued)

(58) Field of Classification Search
CPC .......... H02N 2/105; H02N 2/02; F16H 19/08; F16H 13/12; F16H 49/001; Y10T 74/18056
See application file for complete search history.

(56) References Cited

U.S. PATENT DOCUMENTS 2,906,143 A   9/1959   Musser
3,389,274 A   6/1968   Robertson
(Continued)

FOREIGN PATENT DOCUMENTS

EP   2 220 400 B1   5/2012
JP   2-129436 A    5/1990
(Continued)

OTHER PUBLICATIONS

International Preliminary Report on Patentability with Written Opinion dated Dec. 23, 2014, issued in corresponding International Application No. PCT/CA2013/050472, filed Jun. 19, 2013, 7 pages.
(Continued)

*Primary Examiner* — Jaydi San Martin
(74) *Attorney, Agent, or Firm* — Christensen O'Connor Johnson Kindness PLLC

(57) ABSTRACT

A motion producing device comprising an output member with a contact surface and a reference member. An actuator member is attached to the reference member, the actuator member having a traction surface and comprising actuator zones, each actuator zone being energizable to move a corresponding portion of the traction surface to change a contact state of the traction surface with the contact surface depending on an energized state of the actuator zone. An energy source is operatively coupled to the actuator zones for sequentially changing the energized state of the actuator zones. The actuator member provides a torque transmission path between the reference member and the output member.

36 Claims, 22 Drawing Sheets

(51) Int. Cl.
*F16H 13/12* (2006.01)
*F16H 49/00* (2006.01)
*H02N 1/00* (2006.01)
*H02N 2/10* (2006.01)

(52) U.S. Cl.
CPC .............. *H02N 2/02* (2013.01); *H02N 2/105* (2013.01); *Y10T 74/18056* (2015.01)

(56) References Cited

U.S. PATENT DOCUMENTS

| | | | |
|---|---|---|---|
| 4,734,610 A | | 3/1988 | Okumura et al. |
| 4,974,470 A | | 12/1990 | Ishikawa et al. |
| 5,016,491 A | | 5/1991 | Poro |
| 5,148,068 A | | 9/1992 | Kushida |
| 5,378,948 A | * | 1/1995 | Richter ................ H02N 2/023 310/328 |
| 6,155,220 A | | 12/2000 | Marriott |
| 6,437,485 B1 | | 8/2002 | Johansson |
| 6,664,711 B2 | | 12/2003 | Baudendistel |
| 7,161,278 B2 | | 1/2007 | Johansson |
| 7,247,116 B2 | | 7/2007 | Stoianovici |
| 7,999,422 B2 | | 8/2011 | Dorel |
| 2012/0204674 A1 | | 8/2012 | Lundberg et al. |

FOREIGN PATENT DOCUMENTS

| | | |
|---|---|---|
| JP | 2667209 B2 | 10/1997 |
| WO | 2010/000302 A1 | 1/2010 |
| WO | 2011/060881 A1 | 5/2011 |

OTHER PUBLICATIONS

International Search Report dated Sep. 24, 2013, issued in corresponding International Application No. PCT/CA2013/050472, filed Jun. 19, 2013, 3 pages.

Uchino, K., "Piezoelectric Ultrasonic Motors: Overview," Smart Material Structures 7(3):273-285, Jun. 1998.

Zhu, H.-L., et al., "Minimal Tooth Number of Flexspline in Harmonic Gear Drive With External Wave Generator," Gear Technology 58-62, Oct. 2013.

\* cited by examiner

ACTUATOR USING EXPANSION OR CONTRACTION TO PRODUCE LINEAR OR ROTARY MOTION

CROSS-REFERENCE TO RELATED APPLICATIONS

This application claims the benefit under 35 U.S.C. §119 (e) of U.S. Provisional Application No. 61/661,802, filed Jun. 19, 2012.

TECHNICAL FIELD

Actuators.

BACKGROUND

High torque actuators are difficult to create. U.S. Pat. No. 6,155,220 claims to describe a compact cam phaser that has a flexible spline deformed into a non-round shape and engaging a mating ring gear or circular member at angularly spaced locations for transferring camshaft drive torque between them. While this patent seems to disclose a working embodiment, it uses separate components for torque transfer than for actuation and has other differences from what is disclosed here.

SUMMARY

The inventor has provided in one embodiment a motion producing device with high torque transfer capabilities.

In an embodiment, there is disclosed a motion producing device comprising an output member with a contact surface, a reference member, an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone and an energy source operatively coupled to the actuator zones for sequentially changing the energized state of the actuator zones.

In various embodiments, there may be one or more of the following features: the actuator member providing a torque transmission path between the reference member and the output member; when an actuator zone is energized, the corresponding portion of the traction surface is in contact with the contact surface; the traction surface is preloaded under compression between the output member and the actuator member; the reference member is concentric to the axis and the actuator zones are spaced circumferentially around the reference member; the contact surface of the output member and the traction surface each have cooperating helical shapes to convert rotation of the output member into linear motion; the actuator member comprises a first actuator segment and a second actuator segment that are spaced apart axially; the first actuator segment and the second actuator segment have axially tapered traction surfaces; the respective first actuator segment and the second actuator segment taper oppositely; the output member is at least partly spherical and the reference member is at least partly spherical to rotate within or outside of the output member; the output member and reference member are supported on a shaft; the reference member and output member are each cylindrical and axially movable relative to each other under forces generated by the actuator zones; reinforcement flexures are provided within and disposed around the actuator member, the reinforcement flexures extending radially outward and being slanted circumferentially through the actuator member; the reinforcement flexures are bounded circumferentially by respective inwardly concave and convex surfaces; the actuator member comprises an electroactive material that is expandable or contractable or expandable and contractable in response to an electric current and the actuator zones comprise electrodes; the electrodes may comprise arrays separated in the direction between the reference member and the output member; each actuator zone has an axis and further comprising confining members at respective axially ends of the respective actuator zone; the energy source comprises a hydraulic supply, the actuator zones have hollow interiors and the hydraulic supply is coupled by lines to the hollow interiors; and the output member and reference member are each linear.

In another embodiment there is disclosed a motion producing device comprising an output member with a contact surface, a reference member, an actuator member attached to the reference member, the actuator member having a traction surface and being made at least partially of an expandable or contractable material that is expandable or contactable when energized, the contact surface of the output member being in continuous contact with the traction surface of the actuator member; and an energy source operatively coupled to the actuator member for sequential energization and actuation of spatially separated portions of the actuator member.

In another embodiment there is disclosed a motion producing device comprising an output member with a contact surface and an axis of rotation, a reference member concentric about the axis, an actuator member attached around the reference member, the actuator member having a traction surface and being made at least in part of an expandable or contractable material that is expandable or contractable when energized to press the traction surface against the contact surface or retract the traction surface from the contact surface, the contact surface of the output member and the traction surface each having cooperating helical shapes to convert rotation of the output member into linear motion; and an energy source operatively coupled to the actuator member for sequential energization and actuation of circumferentially spaced portions of the actuator member.

In another embodiment there is disclosed a motion producing device comprising an output member with a contact surface, a reference member, an actuator member attached to the reference member, the actuator member having a traction surface and being at least partly made of an expandable or contractable material that is expandable or contractable when energized to press the traction surface against the contact surface, an energy source operatively coupled to the actuator member for sequential enegization and actuation of spatially separated portions of the actuator member; and the expandable or contractable material being a polymer that is expandable or contractable in response to an electric current and the energy source comprises electrodes in contact with the expandable or contractable material.

In another embodiment there is disclosed a motion producing device comprising an output member with a contact surface and an axis, a reference member concentric with the axis, an actuator member attached around the reference member, the actuator member having a traction surface and being made at least in part of an expandable or contractable material that is expandable or contractable when energized to press the traction surface against the contact surface, the actuator member includes a first actuator segment and a second actuator segment that are spaced apart axially and an energy source operatively coupled to the actuator member for sequential energization and actuation of circumferentially spaced portions of the actuator member.

In another embodiment there is disclosed a motion producing device comprising an output member with a contact surface and an axis, the output member being at least partly spherical, a reference member concentric with the axis and being at least partly spherical to rotate within or outside of the output member, an actuator member attached around the reference member, the actuator member having a traction surface and being made at least in part of an expandable or contractable material that is expandable or contractable when energized to press the fraction surface against the contact surface; and an energy source operatively coupled to the actuator member for sequential energization and actuation of circumferentially spaced portions of the actuator member.

In another embodiment there is disclosed a motion producing device comprising an output member with a contact surface and an axis, a reference member concentric with the axis, an actuator member attached around the reference member, the actuator member having a traction surface and being made at least in part of an expandable or contractable material that is expandable or contractable when energized to press the traction surface against the contact surface, the reference member and output member are each cylindrical and axially movable relative to each other under forces generated by expansion of the expandable or contractable material; and an energy source operatively coupled to the actuator member for sequential energization and actuation of circumferentially spaced portions of the actuator member.

In another embodiment there is disclosed a motion producing device comprising an output member with a contact surface and an axis, a reference member concentric with the axis, an actuator member attached around the reference member, the actuator member having a traction surface and being made at least in part of an expandable or contractable material that is expandable or contractable when energized to press the traction surface against the contact surface, reinforcement flexures within and disposed around the actuator member, the reinforcement flexures extending radially outward and being slanted circumferentially through the expandable or contractable material and an energy source operatively coupled to the actuator member for sequential energization and actuation of circumferentially spaced portions of the actuator member.

In another embodiment there is disclosed a motion producing device comprising an output member with a contact surface, a reference member, an actuator member attached to the reference member, the actuator member having a traction surface and being made at least in part of an expandable or contractable material that is expandable or contractable when energized to press the traction surface against the contact surface, the expandable or contractable material comprising spatially separated expandable or contractable members disposed within the actuator member and each expandable or contractable member having confining members at respective axially ends and an energy source operatively coupled to each expandable or contractable member for sequential energization and actuation of the expandable or contractable members.

In another embodiment there is disclosed a motion producing device comprising an output member with a contact surface, the output member being linear, a reference member, an actuator member attached to the reference member, the actuator member having a traction surface disposed parallel to the contact surface and the traction surface being made at least partially of an expandable or contractable material that is expandable or contractable when energized to press the traction surface against the contact surface or retract the traction surface from the contact surface and an energy source operatively coupled to the actuator member for sequential energization and actuation of spatially separated portions of the actuator member.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
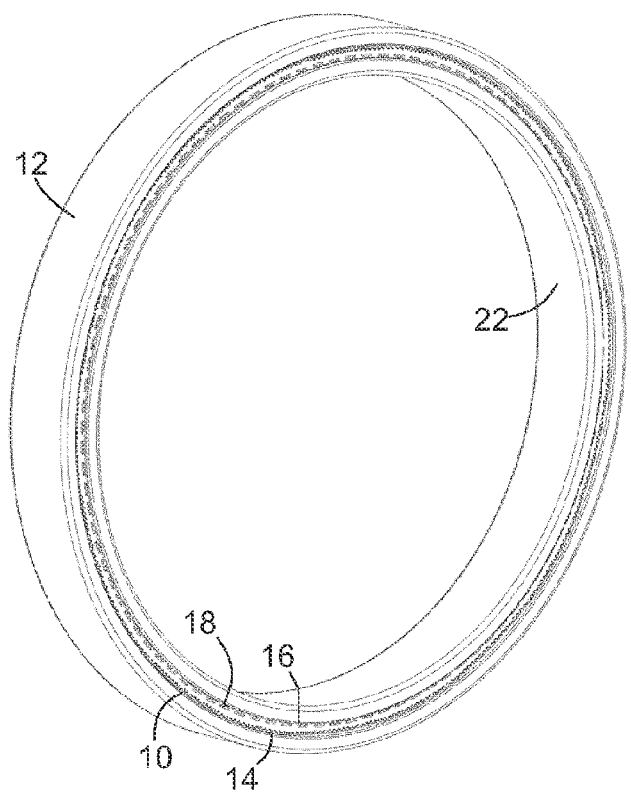
FIG. 1 is an embodiment of a low-profile motion producing device.

Immaterial modifications may be made to the embodiments described here without departing from what is covered by the claims.

Embodiments of the present device, sometimes called a Reactuator, are able to use the deformation of any material which expands and/or contracts when energized by and electrical voltage or other type of electric or electronic signal, to press a ring of material against the inner diameter (ID) of a circular outer race. When this contact is created at one or more positions around the race, and if the contacting area is moved circumferentially by energizing areas of the expanding material at the leading edge of the contact, and de-energizing (or reverse energizing) the areas of the expanding material at the trailing end of the contacting areas, the contacting areas can be caused to move in a circular pattern in either direction around the outer race. The non-contacting area of the traction ring between each contact will have a shorter perimeter distance (measured along the outside surface of the traction ring) than the art distance between the centers of adjacent contact areas measured along the contact surface of the outer ring. As a result, as the contact area progresses along the outer race, the outer race will be caused to rotate.

All embodiments include an output member with a contact surface, a reference member and an actuator member attached to the reference member. The actuator member has a traction surface and comprises actuator zones. Each actuator zone is energizable, by various means such as those disclosed, to move a corresponding portion of the traction surface to change a contact state of the traction surface with the contact surface depending on an energized state of the actuator zone. The contact state can be in contact (extended or at rest position) or out of contact (at rest or contracted position). Energization can cause a material to expand or contract, and thus change the contact state. An energy source is operatively coupled to the actuator zones for sequentially changing the energized state of the actuator zones. As the actuator zones are sequentially energized, a wave moves the actuator member due to the circular path or elliptical path of particles in the material caused by the wave, like water molecules in a wave moving through water. The wave causes the traction surface to move the output member. The movement of the actuator member causes a near radial movement (or perpendicular to the surface for linear actuator—or circular) of a point on the contact surface when the material or chamber below that point is energized during the formation (as opposed to propagation) of a wave crest.

In some embodiments, the actuator member provides a torque transmission path between the reference member and the output member. However, in some embodiments, other material can be in the torque transmission path.

In some embodiments, the output member has an axis and is circular. In others, it is linear, spherical or cylindrical. A reference member may be concentric with the axis, or otherwise has a shape that conforms to the shape of the output member. The actuator member may be attached around or along or to the reference member, either inside or outside, above or below. The actuator member may be made at least partially of an expandable or contractable material that is expandable or contractable when energized to press the fraction surface against the contact surface. The energy source may be operatively coupled to the actuator member for sequential energization and actuation of circumferentially spaced portions of the actuator member. The reference member may be inside or outside the output member but the traction surface will always be between the reference member and the output member. Depending on the embodiment, the expandable or contractable material may be expandable or contractable when energized to press the traction surface against the contact surface from a position in which the traction surface is separated from the contact surface to a position in which the traction surface is in contact with the contact surface or the contact surface may be in continuous contact with the traction surface. For materials that contract when energized, the actuator member may be initially in contact and lose contact with the output member when energized. This would enable an actuator to be always in contact when not energized and then to operate to create rotational output by energizing areas which pull away form or have reduced contact pressure in a propagating wave.

Depending on the embodiment, the actuation member may have sealed chambers which expand by movement of a material, for example by hydraulic actuation or compressible fluid actuation of expandable chambers within the expandable material or electromechanical actuation of expandable chambers within the actuation member. The chambers may be sealed with an inner lining of material that does not generate a lot of heat when energized such as silicone.

One example, shown here in FIG. 1, has a fraction surface formed by a traction ring 14 that is made of material such as nylon 66 (but many different types of plastic and-or metallic and-or ceramic and-or polyamide and/or other types of materials may be used). Traction coatings on the outside of the actuator surface (which is in contact with the outer race) may also be used instead of a separate ring (not shown). As shown in FIG. 1, the actuator member provides a torque transmission path between the inner reference ring and the output ring. If the actuator ring material has the desired characteristics such as a coefficient of friction which provides the desired torque, then coatings and/or a separate traction ring may not be necessary. Other desirable characteristics of this traction ring include the ability to deform slightly in shear in the direction of rotation enough to prevent undue sliding between the traction ring and the outer race. When sliding does occur, it is preferable that this material, or coating, or combination of materials does not create significant each or wear.

The actuator disclosed here takes advantage of the high forces that can be exerted by electro-reactive materials as well as the high-speed in which these materials can react to produce a high torque output together with a wide range of output speeds. It can also be constructed as a very low profile and light weight device. Certain configurations of the present device are also believed to be very cost effective by allowing the use of a low volume of material, and also, in some configurations, relatively inexpensive materials.

The actuator disclosed here can also be used as its own bearing support, reducing the cost and weight and complexity of the additional bearings. The amount of torque transferred can also be varied separately from the variation of output speed, by increasing or decreasing the voltage (or other energizing signal) independently from the speed of the contact waveform progression circumferentially along the outer race.

FIG. 1 shows an exemplary embodiment of a low-profile actuator of an embodiment of the present design. It uses a aluminum outer output race or member 12 (but many other materials could also be used), an aluminum inside reference race or member 22 (but many other materials may also be used), and electro reactive actuator ring or member 16 preferably of a polymer (but other electro-reactive materials can also be used in other embodiments) which is fixed to the inner race 22, and a fraction ring 14 made of nylon 66 (but many other materials can also be used) and fixed to the outside of the actuator ring 16 and contacts the ID of the outer race 12 anywhere the actuator ring is energized. Due to the high expansion force generated by some electroreactive materials, and because of the relatively high flexibility of a material like nylon 66, a large number of contacts can be provided between the outer race 12 and traction ring 14. The surface area of these contacts can also be extremely high (as compared to, for example, the contact of a roller on a race which is a very thin line) and so the combination of this high surface area and high contact pressure is believed to be able to produce a output torque which may exceed certain conventional actuator systems of similar size and weight or provide a lower cost option.

Figure 2:
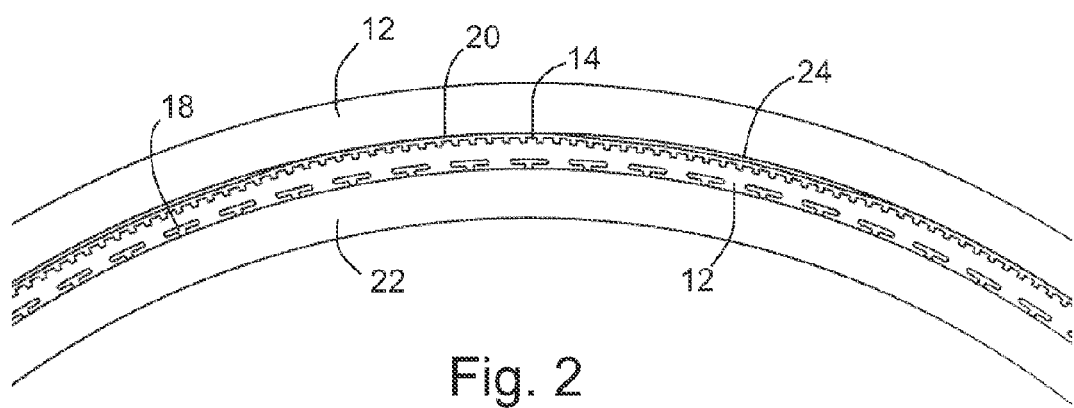
FIG. 2 is a simplified partial section of the motion producing device of FIG. 1.

FIG. 2 shows the outer race 12 in traction contact with the OD of traction ring 14 when the actuator ring 16 is energized in one or more (and preferable three or more) equally spaced zones. The traction ring 14 is mechanically fixed and/or bonded to the actuator ring 16. The actuator ring is mechanically fixed and/or bonded to the inner race 22. Electrodes 18 are in electrical contact with the actuator ring 16 providing a charge across the actuator ring to the other side. Between each of the contacts 20 between the traction ring and the outer race there are non-contacting gaps 24.

Figure 3:
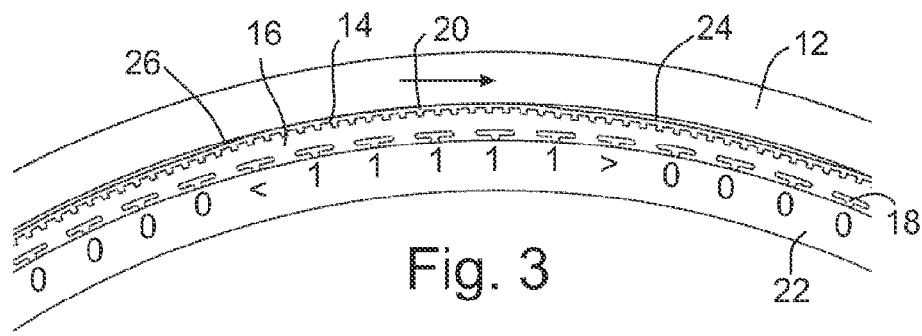
FIG. 3 is a simplified partial section of the motion producing device of FIG. 1 showing an example of an applied voltage pattern.

In one embodiment, the traction ring has an outside diameter of 3.98" when it is not elastically deformed. The outer race, in this exemplary embodiment, has an internal diameter of 4" leaving a gap between the two diameters of 0.01" inches (if the electro-reactive actuating ring is not energized and/or in a neutral position) but significantly larger gaps or significantly smaller gaps may also be used. (Significantly larger and significantly smaller diameters for an actuator of this type are also possible ranging from diameters of 10 feet or more down to 1 inch or smaller or microscopically small using MEMS manufacturing techniques). When, in this exemplary embodiment, 10 sets (one "set" referring to two electrodes, one on either side or and of an area which is charged by an electrical current between these electrodes) of preferably equally spaced electrodes (but smaller numbers or greater numbers can also be used) on either axial side of the electro-reactive actuating ring are supplied a voltage, the material expands in the radial direction creating an array of contact surfaces 20 between the outer diameter (OD) of the traction ring 14 and the ID of the outer race 12. In this exemplary embodiment, there are 100 electrodes on either side of the traction ring (but a greater number or lesser number of electrodes could also be used with different effects). With 100 electrodes on either side of the actuator ring, it is possible to have 2 or more, 3 or more, 4 or more, 5 or more, 6 or more, 7 or more, 8 or more, 9 or more, 10 or more, 15 or more, 20 or more, 25 or more, 30 or more, 35 or more, 40 or more, 45 or more, or 50 contacts between the fraction ring and the outer race with non-contacting gaps between each of these contacts. With 10 contacts, as shown in this example, using a larger number of electrodes than the number of contacts, allows the contacting surface between the traction ring in the outer race to progress gradually from contacting to non-contacting along the leading edge of each contact. It also allows the trailing edge of each contact to progress gradually from a state of contacting to non-contacting. FIG. 3 shows an example of the contact surfaces traveling counterclockwise along the outer race which will in turn produce a clockwise rotation of the outer race if the inner reference race is fixed. As shown in FIG. 3, voltage is applied to electrodes 18 labeled with a "1". Voltage is not applied to the electrodes 18 labeled "0". Voltage is moving from low or zero to increased voltage at electrodes labeled "<". Electrodes labeled ">" indicate voltage reducing from energized to lower or zero voltage. The voltage corresponds to the energized state of the energy source. Energizing progressively (sequentially) more electrodes and sections of the electro-reactive ring at the leading edge 26 of the contact areas (in FIG. 3 at the left side of each contact) the outer ring is caused to rotate clockwise (Arrow A).

Figure 4:
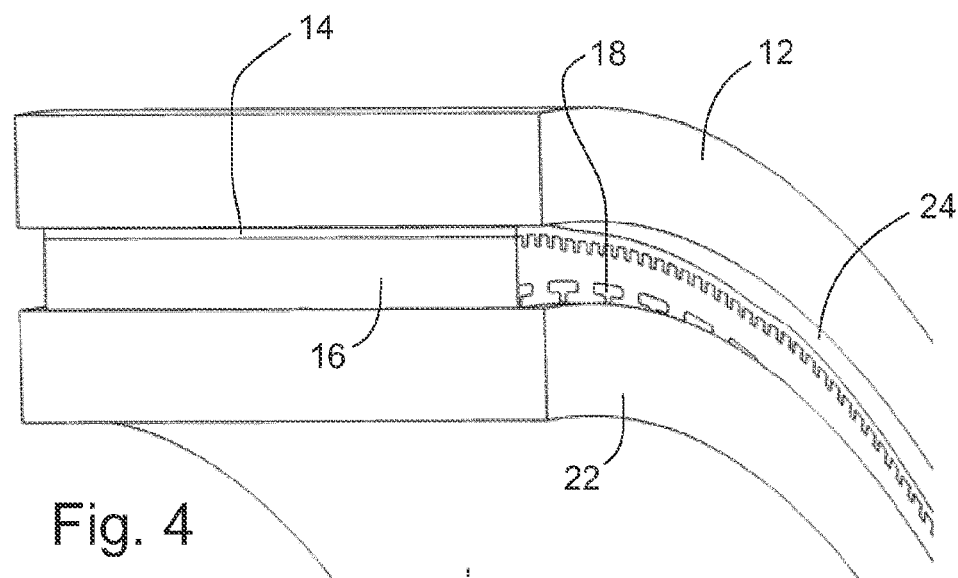
FIG. 4 is a simplified cross section of the motion producing device of FIG. 1.

FIG. 4 shows a cross section of a simplified example of an embodiment of a motion producing device. Although this cross section illustrates components necessary for the basic operating principle, including outer race or member 12, inner ring or reference member 22, traction ring 14, actuator ring or member 16 and electrodes 18, which define the actuator zones, additional preferable features (not shown) may include axial locating means for the outer race. Radial and/or axial roller or sliding bearings may be used, but with the significant radial load provided by the working principle of the actuator, it is believed that additional bearings may not be necessary for many applications.

Figure 5:
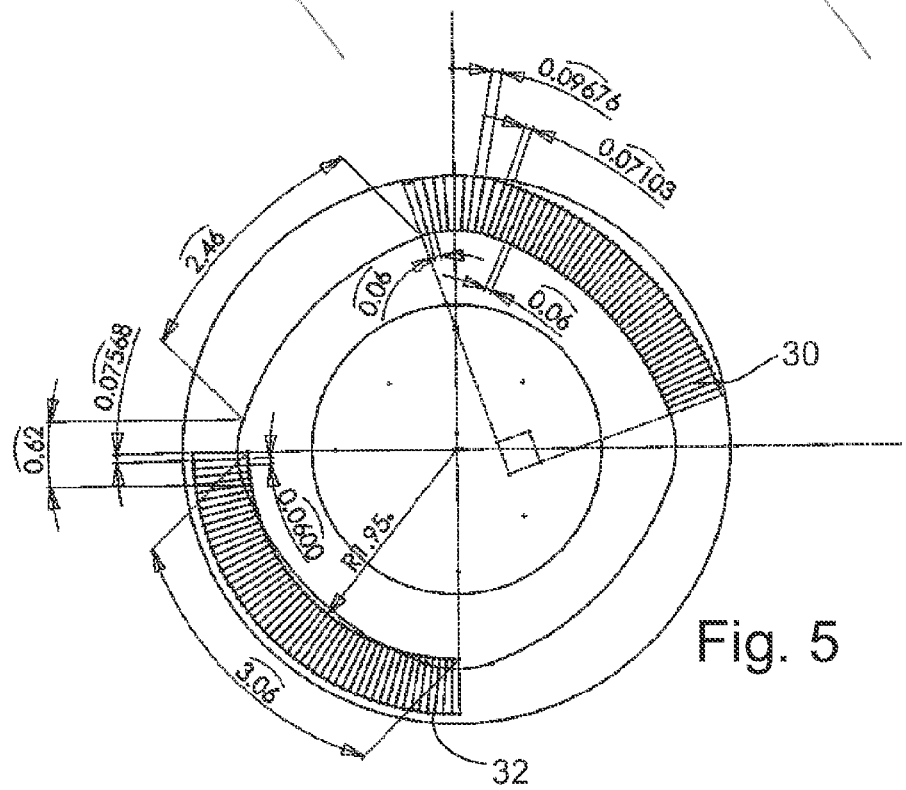
FIG. 5 is an exaggerated partial schematic of an embodiment of a motion producing device showing the motion transfer principle of operation.

FIG. 5 shows an exaggerated partial schematic of an embodiment of a motion producing device showing four points of contact between the deformed traction ring 30 and the output race. Also shown is a 90° section of the same traction ring in its relaxed state 32 with no forces acting on it from energizing of the actuation ring.

Referring now to a 90° section of the traction ring in both the relaxed state and the deformed state, the internal arc length of the relaxed state (3.06") and the deformed state (0.62"+2.46"=3.06") are equal. In both states the inner surface of each of the 90° traction ring sections are divided into 51 equal sections of 0.06" arc length.

Dividing the outer surface of the traction ring, in its relaxed state, gives us 51 sections, each with an arc length of 0.07568". As shown in FIG. 5, when the actuation ring is energized at four equally spaced positions such that the traction race comes into contact with the ID of the output race, sections between the contact areas exhibit an outer surface which is compressed (as compared to when the traction ring is in the relaxed state) as shown in FIG. 5 by the change in arc length from 0.07568" to the compressed length of 0.07103". More importantly, for the purpose of this explanation of the motion transfer principle, the smaller radius section of the traction ring contact surface at the contact point with the output race requires the deformation of the traction ring into a smaller radius (than when it is in a relaxed state) whereby the outer surface of the traction ring must elongate as shown here by the increased length of each contacting section to an arc length of 0.09676".

Figure 6:
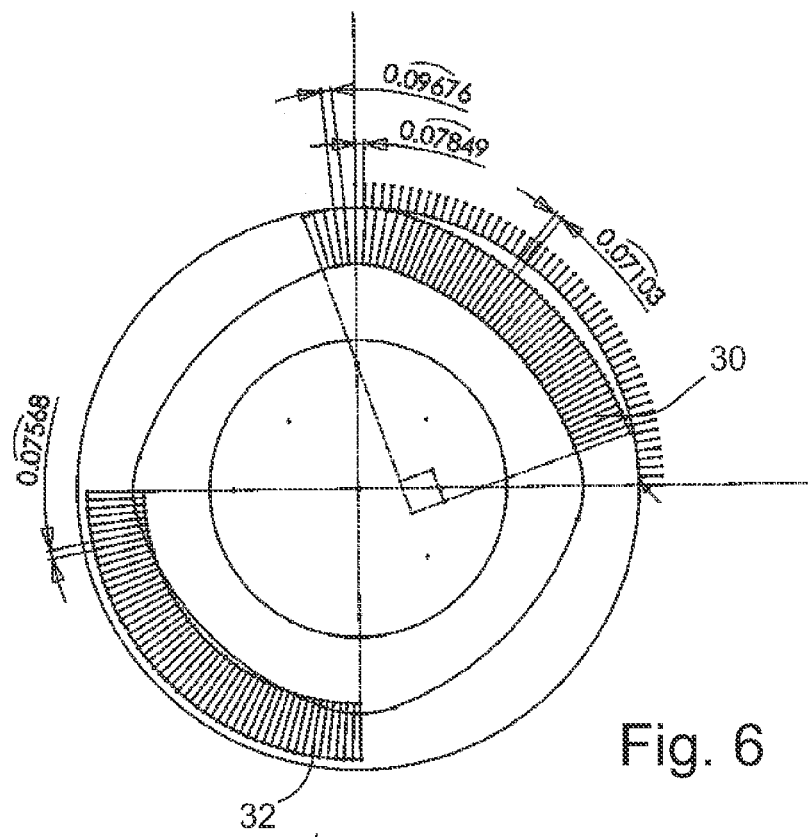
FIG. 6 is the schematic of FIG. 5 showing the arc length of the outer rotor contact surface.

This is shown in FIG. 6, where each of the 51 sections which is deformed into a tighter radius, has the same root arc length of 0.06" and an outer surface arc length of 0.09676". A 90 degree segment of the outer rotor contact surface is also divided into 51 segments. The 0.07849" arc length of these segments, (although longer than the arc length of the traction ring contact surface segments when the traction ring is in a relaxed state) are shorter than the 0.09676" arc length of the traction ring contact surface segments. As a result, the progression of the smaller radius deformation of the traction ring contact surface will "roll" along the contact race in the opposite direction to the rotational direction of the actuation ring and traction ring deformation as defined by the progression of the energized "wave" generated by the activation of each electrode in one direction or the other.

As a result of this elongation of the traction ring contact surface (where it is in contact with the output race) the traction ring contact surface will have a greater surface length, for a given root arc length (in this illustration, the root length being 0.06") as it contacts the output race than it does when it is in the relaxed state. This effect is significant enough, that the surface speed of the contact surface of the fraction ring when it is deformed into a smaller radius in order to contact the output race will have a greater surface length for the root arc length than it would if it was in the relaxed state and if (hypothetically, for illustrative purposes) it was deformed in all directions to the same diameter as the output race contact surface with a consistent contact surface curvature all the way around the OD. This is shown in FIG. 7 where a segment of the relaxed state traction ring is extended out to the output race where the arc distance at the fraction ring diameter is 0.07849".

The curved arrow in FIG. 3 shows an example of the direction of contact surface progression (which has the appearance of a rotation) as results from the energizing of adjacent areas of the actuator ring in the clockwise direction, and the counterclockwise relative direction of movement of the contact surface of the traction ring contact surface which results, and the clockwise relative movement of the output ring which results.

Figure 7:
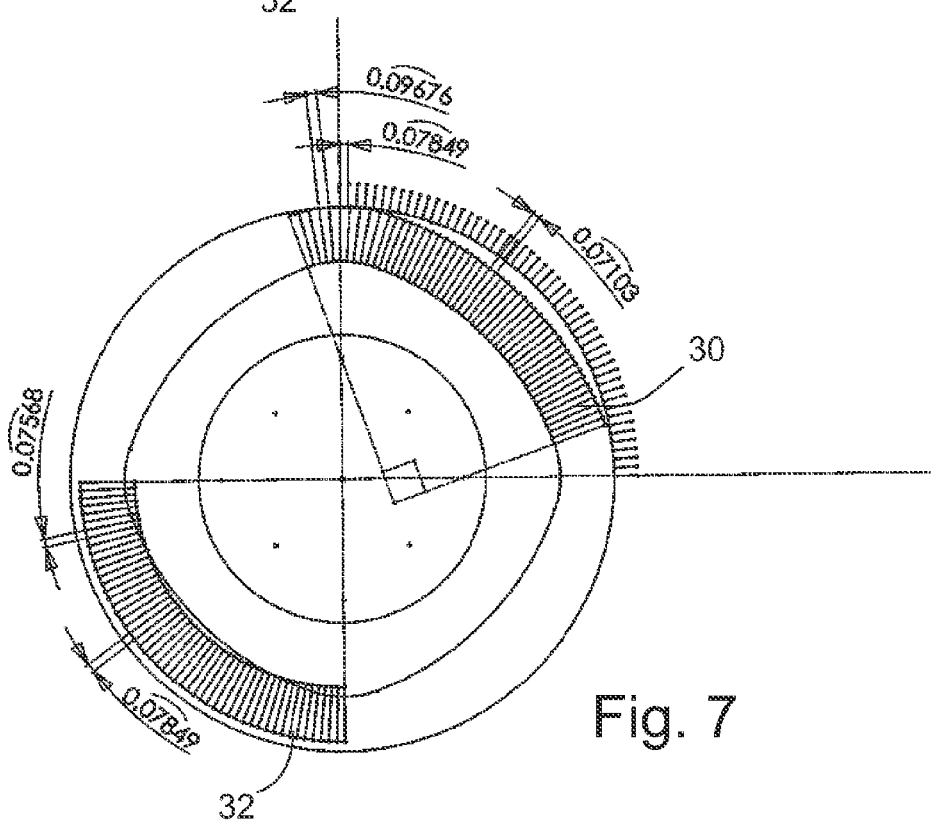
FIG. 7 is the schematic of FIG. 5 showing the arc length of the fraction ring in a relaxed state.

All segmentation shown in FIGS. 5-7 is strictly to illustrate the surface length of the various components and is not part of the construction or function of an actual physical device of the present disclosure. The deformation of an actual device is likely to be much less pronounced than the illustration shown in FIGS. 5-7. These are shown with exaggerated geometry to illustrate the principle.

Figure 8:
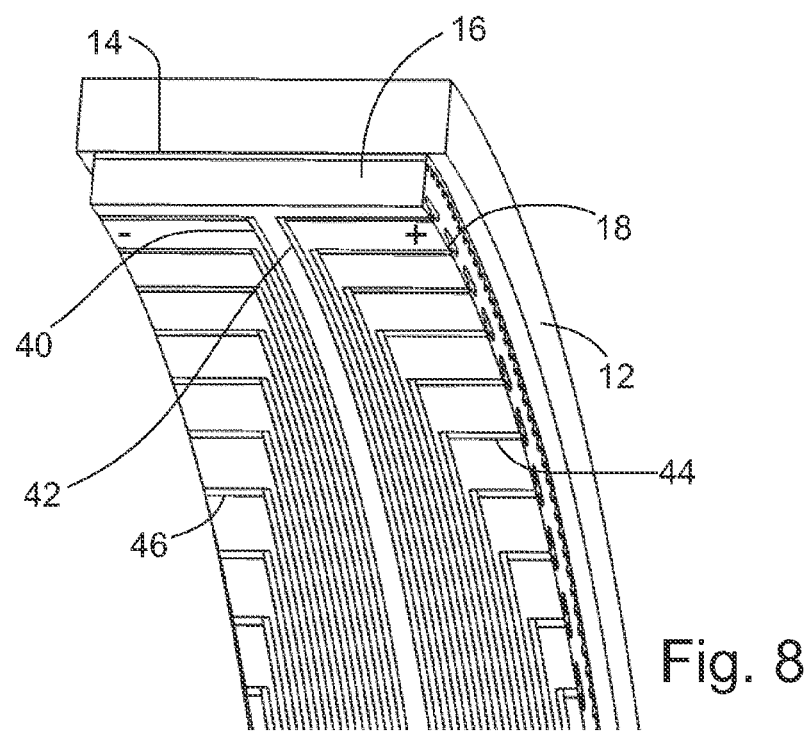
FIG. 8 is a simplified cross-section schematic of the motion producing device of FIG. 1 showing an array of electrical circuits.

Shown in FIG. 8 is a simplified view of an array of electrical circuits as an example of one of many ways which can be used to supply electrical voltage and/or signal to and from the electro-reactive actuator ring 16. For simplicity, in this example, circuits to only one section of the actuator ring are shown here. All of these connections 40 or 42 preferably go to 10 input wires 44 to the device (the number 10 here being used as an example only, as fewer input and/or output wires or a greater number of input and/or output wires could also be used) and 10 output wires 46 from the device such that, in this example, each of the single input wires is connected to 10 equally spaced electrodes 18 on one side of the actuator ring, and each of the 10 output wires is connected to electrodes 18 opposite these input electrodes. With 10 sets of input and output wires, as shown in FIG. 8, every $10^{th}$ positive electrode is preferably connected through a common circuit 42 to the same input wire to the device and every $10^{th}$ negative electrode is preferably connected through a common circuit 40 to the same output wire to the device.

A computerized controller determines which electrodes are energized. The control system for this device is considered to be relatively straightforward because electrodes are simply energized and de-energized (preferably, but not necessarily, according to a predetermined voltage ramp up and ramp down function which may be dependent on speed and other variables) in sequence. In its simplest form, the control algorithm does not make it necessary to provide feedback to the controller. The speed and/or frequency of the energizing and de-energizing of the electrodes will increase or decrease the speed of the output. The maximum torque output of the device will increase if increased voltage is supplied to the electrodes. The magnitude of this voltage can be controlled independently of the switching frequency.

By controlling the voltage to the contacts such that very light contact or minimal or no contact (for one or more of the contact areas) it is possible to allow free motion of the actuator joint such as when "back driving" of the robotic joint is desirable. One example would be for an anthropomorphic robot to produce smooth, humanlike movements. A high torque impulse can be applied to and through the actuator member which thus acts as a torque transmission path, and then once it has accelerated to the maximum desired speed, the voltage to the actuator can be reduced to where the components simply slides on the traction ring such that it decelerates at a rate which is dependent on the friction of the traction ring/output ring interface and the amount of preload as determined by input voltage to the contacts.

Actuator materials may be electroactive polymers or non-electroactive transducers. Examples of electroactive polymers include dielectric elastomers (e.g. acrylic or silicone), electrostrictive polymer (e.g. $(P(VDF-TrFE-CFE)^2$ or graft elastomer), electrochemo-mechanical conducting polymer (e.g. polyaniline), mechano-chemical polymer/gels (e.g. polyelectrolyte) or piezoelectric polymer (e.g. PVDF); examples of non-electroactive transducers include electrostatic devices (e.g. integrated force array), electromagnetic (e.g. voice coil), piezoelectric (e.g. ceramic (PZT) or single crystal (PZN-PT)), shape memory alloy (e.g. TiNi), shape memory polymer, thermal (expansion), magnetostrictive (e.g. Terfenol-D, Etrema products) and natural muscle (e.g. human skeletal) (from Kornbluh, R. et al., 2002, *Electroactive polymers: An emerging technology for MEMS*, MEMS/MOEMS Components and Their Applications, Proc. of SPIE Vol 5344, pp. 13-27).

Electro-reactive materials can be very fast acting, and some of them can also generate very high force as they expand. The drawback of these materials is that many of them are not able to transmit force over a high displacement. Piezo ceramics, for example, are generally limited to an expansion ratio of approximately 1% or 2%. This actuator takes advantage of the high speed and high force of Piezo and/or polymer and/or other electro-reactive materials which expand and/or contract when a voltage is applied to them.

Depending on the electrical properties of the electro-reactive material, it may be necessary to provide a level of insulation between the areas of the actuator ring which are energized by each set of electrodes. It would be possible to use individual separated pieces of electro-reactive material between each of the electrodes, but the rotational sheer load on the actuator ring may be substantial and the use of a one piece actuator ring may be desirable for this reason. Other variations, such as connecting electrodes on both sides of the actuator ring which are not directly opposite each other can be used to produce various effects.

There are very many ways to configure this basic operating principle into an actuator, motor, or another rotary device. Other embodiments would include the actuator ring attached to the outer ring (with the outer ring being the fixed or "reference" ring) with a rotating inner ring as the output.

Figure 9:
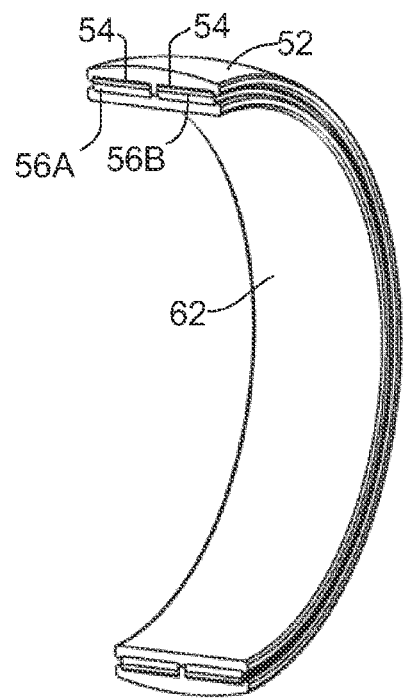
FIG. 9 is a simplified cross-section schematic of an embodiment of a motion producing device with two sets of actuator rings and traction rings.

FIG. 9 shows a cross-section schematic of a simplified example of a actuator according to an embodiment of a motion producing device with two sets of actuator rings or members 56 and traction rings or members 14 configured in such a way as to provide axial stability for the output ring or member 52. Shoulders on the reference member may be used to help axially align the actuator member 56. The actuator member 56 and its segments 56A and 56B are also constrained axially by centrally located shoulders on either side of a central protrusion, and lateral shoulders on respective lateral protrusions. In this embodiment, the actuator member includes a first actuator segment 56A and a second actuator segment 56B that are spaced apart axially. The fraction rings 54 are mechanically fixed and/or bonded to the actuator rings 56. The actuator rings 56 are mechanically fixed and/or bonded to the inner race 62. Electrical contacts are not shown in FIG. 9.

Attachments to the inner and outer rings are not shown in some of the figures in this disclosure. There are many ways to connect the reference members and output members to external components including bolting, adhering, welding, and fabricating as one piece with other components.

Figure 10:
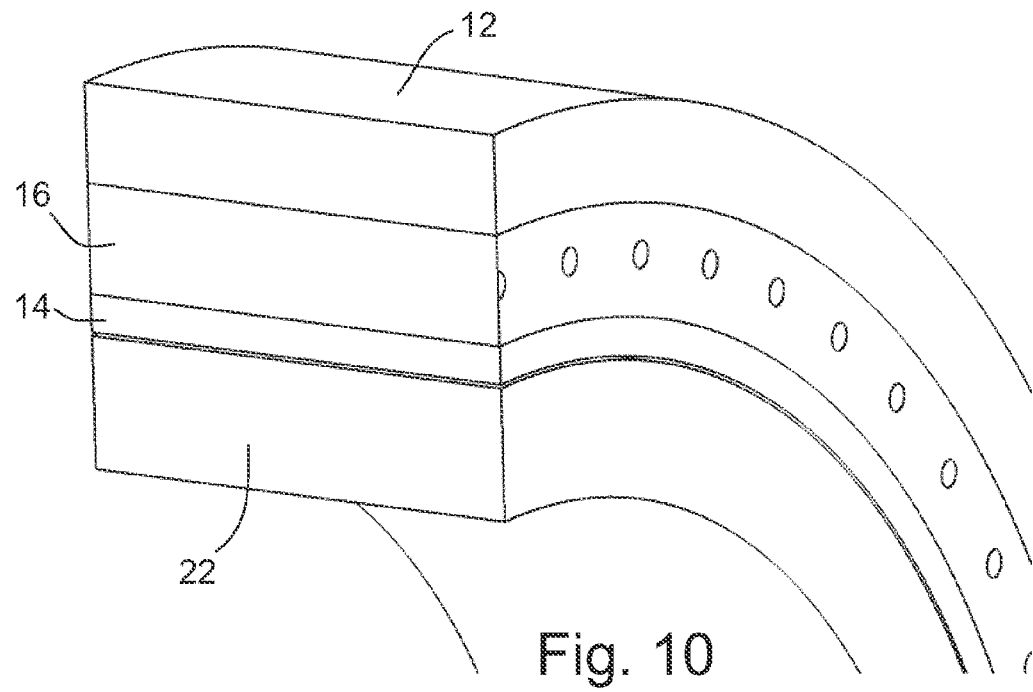
FIG. 10 is a simplified cross-section schematic of an embodiment of a motion producing device where the actuator race and traction ring are mechanically fixed to the outer ring.

FIG. 10 shows a section view of a simplified schematic of an embodiment of a rotary actuator according to present device where the actuator race 16 and fraction ring 14 are mechanically fixed to and/or bonded to the outer ring 12. The inner ring, in this exemplary embodiment serves as the output race.

Figure 11:
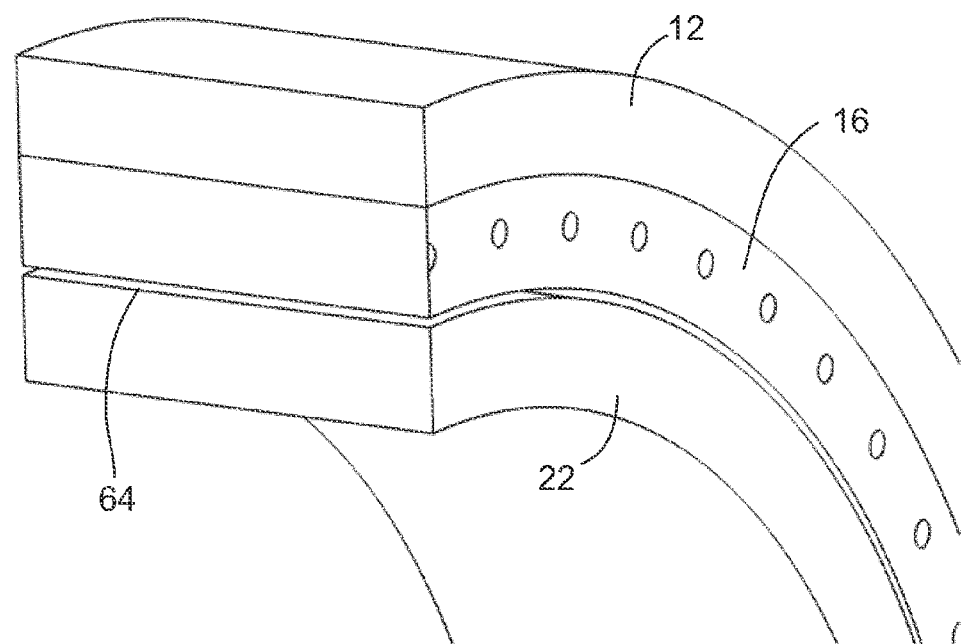
FIG. 11 is a simplified cross-section schematic of an embodiment of a motion producing device where the inner ring is the output.

FIG. 11 shows a simplified cross-section schematic view of an exemplary embodiment of a motion producing device, the inner ring 22 is the output, and the actuator ring 16 inside diameter surface 64 serves as the contact surface with the inner ring.

Figure 12:
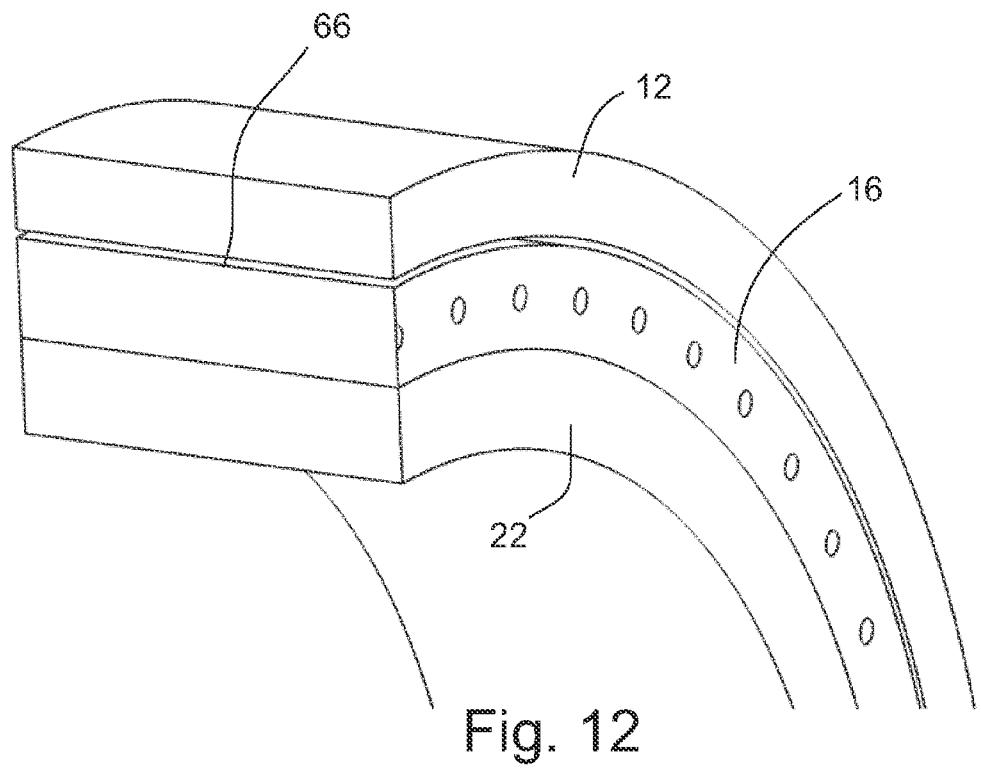
FIG. 12 is a simplified cross-section schematic of an embodiment of a motion producing device where the outer diameter of the actuator ring is the contact surface with the outer ring.

FIG. 12 shows a simplified cross-section schematic view of an exemplary embodiment of device motion producing device, the outer ring 12 is the output, and the actuator ring 16 outside diameter surface 66 serves as the contact surface with the outer ring.

Figure 13:
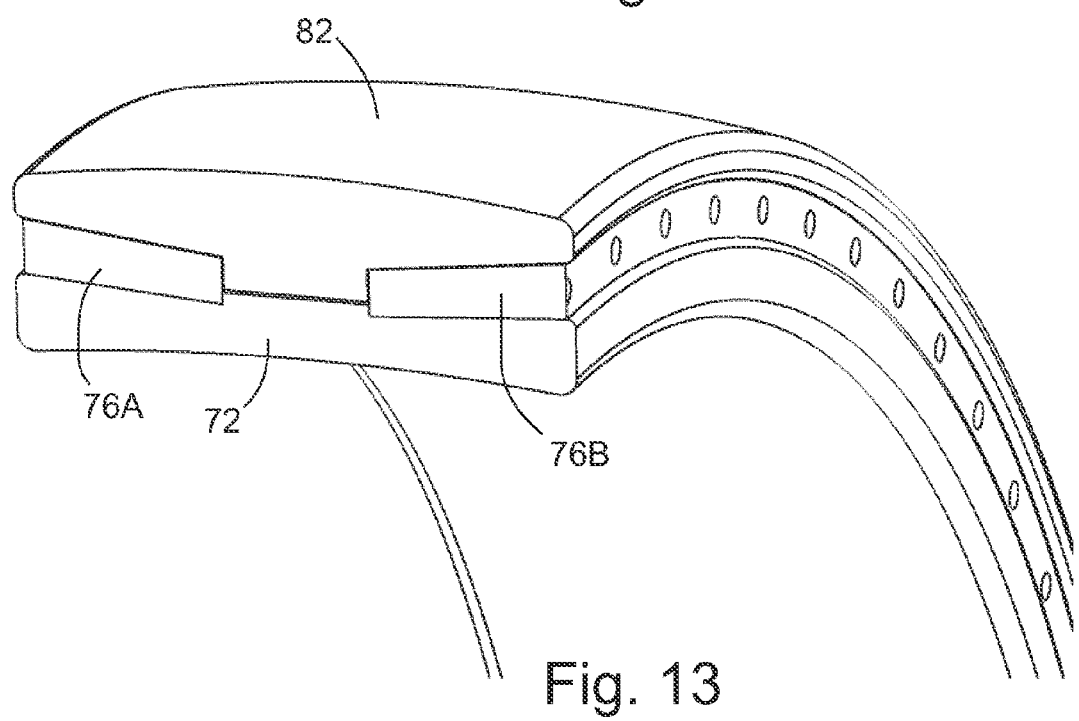
FIG. 13 is a simplified cross-section schematic of an embodiment of a motion producing device where the actuator rings are constructed with a taper.

FIG. 13 shows a simplified cross-section schematic view of an exemplary embodiment of a motion producing device with outer ring 62 and inner ring 72 where the actuator rings 76 are constructed with a taper to provide stability between the reference output race. Thus, the first actuator segment and the second actuator segment have axially tapered traction surfaces, and in this embodiment, the respective first actuator segment 76A and the second actuator segment 76B taper oppositely.

In order to achieve effective operation of an embodiment of a motion producing device it will be necessary to allow the actuator ring and/or the traction ring to elastically deform in shear as a result of the outer ring rotating relative to the inner ring while there is a direct connection between traction surface through the actuator ring to the inner ring. The higher this shear deformation of the fraction ring and/or actuator ring, the lower the efficiency of the actuator because the energy which goes into elastically we deforming these components is not recovered and may cause sliding of the traction ring (or traction surface of no separate traction ring material is used) against the outer race at the leading and/or trailing edge of each contact.

Longer (in the circumferential direction) contact surfaces will provide paths with higher torque transmission capacity but will produce greater shear and greater inefficiency. For this reason, it is preferable to energize fewer electrodes at each contact when the system is operating under low torque to provide the necessary torque with the shortest possible contact link at each contact. When higher torque is required, the width of each contact can be increased without changing the number of contacts.

The number of contacts (waves peaks) can be changed when the actuators at rest, or even when it is in operation for different effects. A greater number of waves is believed to be better with respect to reducing the shear displacement of the actuator ring between contacts but still maximizing torque. The closer the contacts are together, the less differential length there will be between each contact with respect to the length of the circumferential distance along fixed race between contact centers and the perimeter length of the traction ring between contact centers. This will have the effect of reducing the rotational speed of the output ring for a given wave rotation speed.

If piezo ceramics or other alters sonic transducer suitable materials are used, it may be possible to analyze the signal produced during actuation of these different areas of the actuator ring, to determine the rotational position and/or speed of the actuator output. If one or more anomalies in the outer race material (preferably somewhere radially outward from the contact surface) are designed into the system, it may be possible to sense the relative position of these anomalies to the inner ring using ultrasonic feedback transferred through the contact surfaces to the outer race. These ultrasonic signals will reflect off of the anomaly/s and may be readable by the same or it different section of the actuator ring which produced the signal.

Additional ultrasonic and/or other types of sensors may be used in conjunction with the electro-reactive materials which are configured to transfer torque and motion as described here. The actuator ring can be coated with a material that has the desired fraction contact characteristics, or electro-reactive materials which provide the desired contact properties (such as high coefficient of friction when loaded, and for some applications, a minimal-wearing and non-stick-slip interface when loads are reduced and/or when sliding is desirable, such as during an over torque scenario or when it is desirable for the actuated member to move freely) can be used without a traction ring or without a different material coating on the traction surface.

Instead of pure traction, it may be beneficial in some applications to use a geared interface between the actuator and or traction ring and the outer race.

Figure 14:
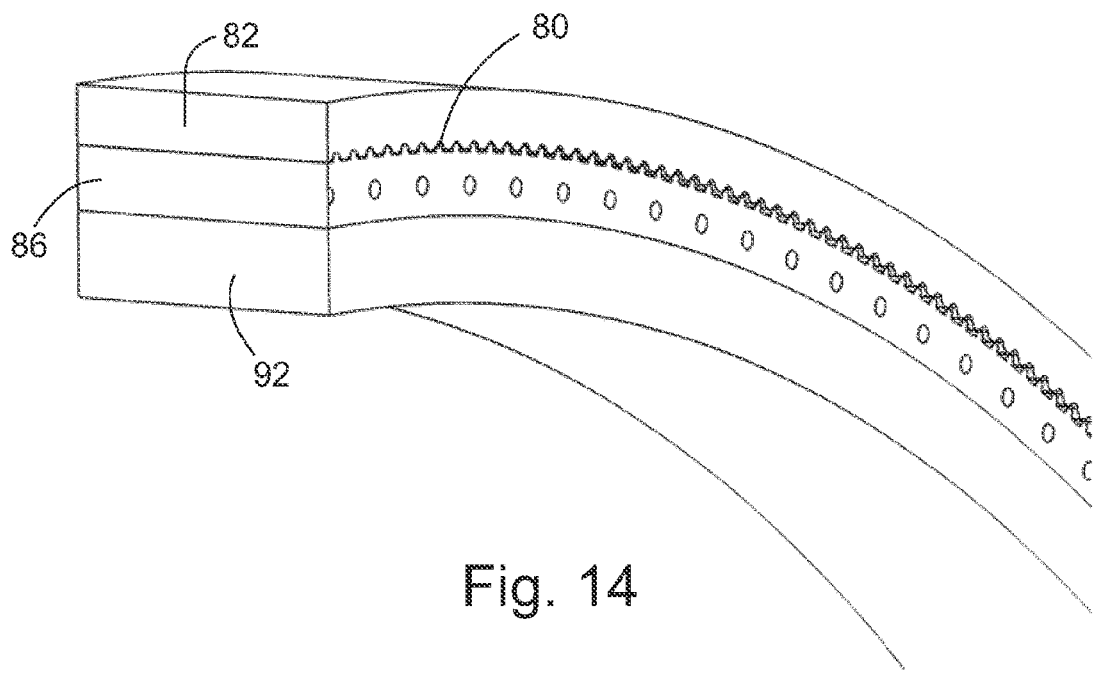
FIG. 14 is a simplified cross-section schematic of an embodiment of a motion producing device with a toothed interface between the fraction ring and the outer ring.

Example of a toothed engagement embodiment. FIG. 14 shows an embodiment of invention motion producing device that uses a toothed interface 80 between the traction ring 86 (which in this case does not rely on traction and is preferably a low friction surface) and the output member. In this embodiment, the output member is the outer ring 82 and the shape changing layer is attached to the inner reference ring 92. Conventional gear teeth can be used but it is preferable to use rounded gear teeth more similar to what is used in a conventional roller harmonic drive. In this simplified section view, four expanding areas are used at 90 degrees to each other. A higher or lower number of expanding (contacting) areas (or zones) can be used, as long at the inner toothed member has at least a one tooth difference from the outer toothed member in between each contact zone.

Figure 15:
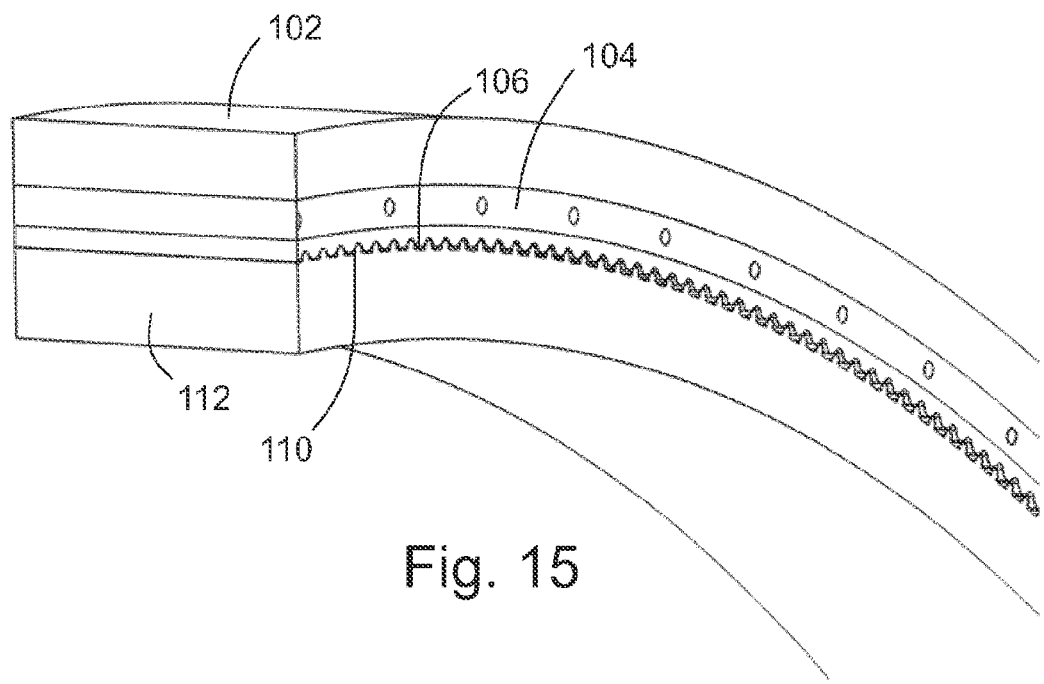
FIG. 15 is a simplified cross-section schematic of an embodiment of a motion producing device with a toothed interface between the fraction ring and the inner ring.

FIG. 15 shows a similar toothed interface embodiment that uses a toothed interface 110 between the traction ring 106 and the output member, with the shape changing layer 104 on the outer ring 102. In this embodiment, the output member is the inner ring 112.

Figure 16:
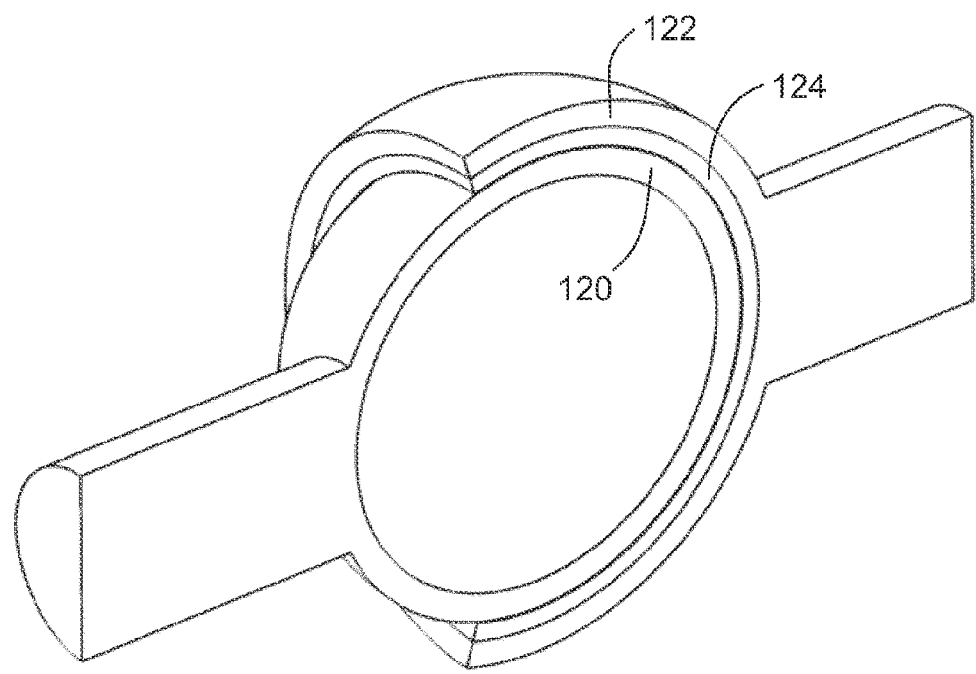
FIG. 16 is a simplified cross-section schematic of a spherical embodiment of a motion producing device.

Example of a spherical/semi-spherical surface embodiment: FIG. 16 shows a simplified schematic section of a spherical embodiment of a motion producing device, with an inner sphere 120, outer sphere 122 and actuation layer 124.

Figure 17:
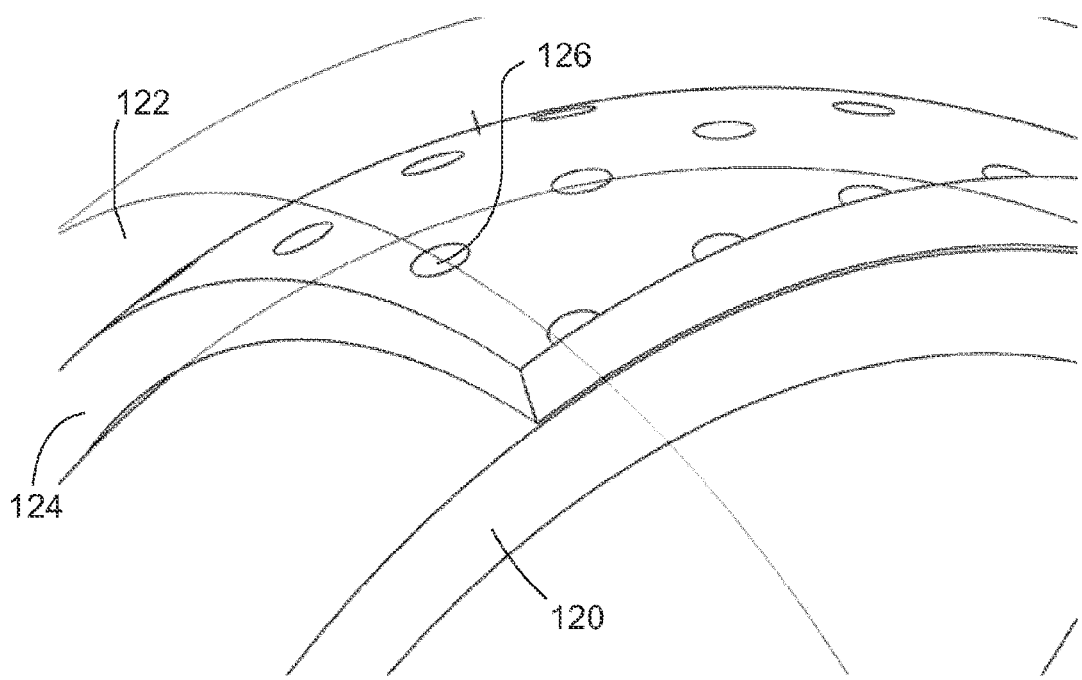
FIG. 17 is a detail of the spherical embodiment of FIG. 16.

FIG. 17 shows the detail of the window in FIG. 16 showing the schematic spherical embodiment partially disassembled with an array of circles representing actuating inputs 126. These could be of any type depending on how the actuation material is caused to change shape. In a spherical actuator 124 as shown here, contacts with the output sphere can be created by deforming the actuation layer material so it expands to close in on the output sphere. Alternatively (and as would apply to other embodiments in this disclosure, the actuation layer could be preloaded against the output member and the actuation layer could be contracted everywhere except at the desired contact points) expanding and contracting of the material at the same time in different areas is a preferred method of actuating any of the devices in this disclosure if the material allows this combined actuation method. In this embodiment with the actuator member pre-loaded, the contact surface of the output member is in continuous contact with the traction surface of the actuator member and may retract upon actuation.

Figure 18:
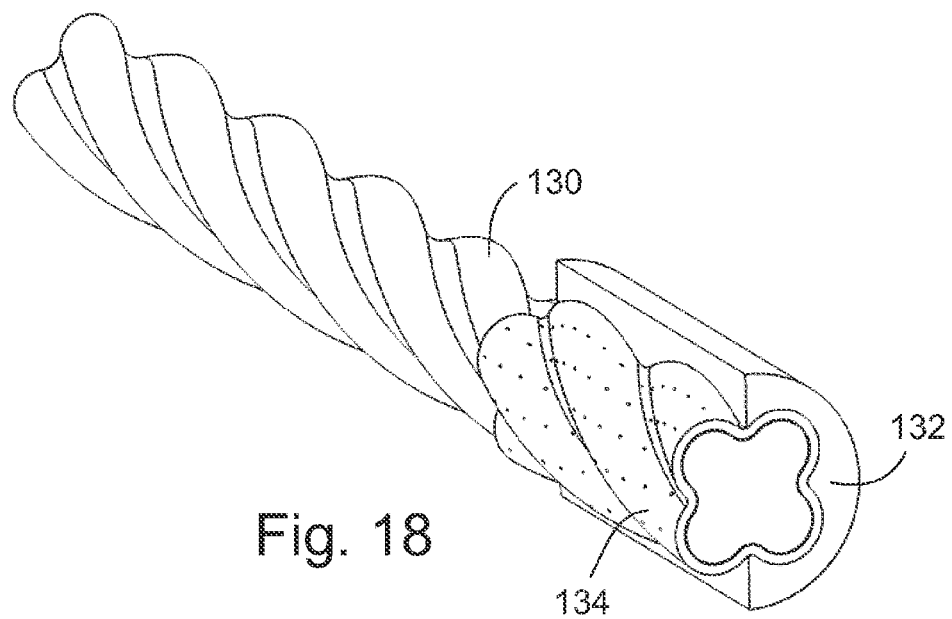
FIG. 18 is a simplified cross-section schematic of a helical/linear drive embodiment of a motion producing device.

Example of helical linear actuator embodiment: FIG. 18 shows a simplified schematic helical/linear drive embodiment with a sectioned housing/reference member 132 (such as could be used in place of a conventional ballscrew actuator) according to an embodiment of a motion producing device (shown here in a relaxed state with a gap between the actuation layer contact surface and the helical shaft contacts surface). In this embodiment, the contact surface of the output member and the traction surface each have cooperating helical shapes to convert rotation of the output member into linear motion. By deforming the shape change actuator member 134 generating one or more (and preferably three or more) contact patches around the circumference of the helical shaft 132, and then causing these contact patches to move tangentially along the surface of the shaft, will cause the shaft to spin and, as a result of the helical shape, to move in an axial direction. The contact patches can be in a line parallel to the axes of the helix, and/or they can be helical in shape, and or another shape. The movement of the contact patches can be circular on a plane perpendicular to the axis of the helical shaft and/or in a helical motion and or another motion that has a circular and/or linear (parallel to the axis of the helical shaft) component to it.

By moving the contact patches in a direction which is aligned with or mostly aligned with the center of lengthwise axis of the helical shaft, higher speed movement of the helical shaft relative to the reference member can be accomplished. By moving the contact patches in a direction which is circular or primarily circular (tangentially or partially tangentially) to the lengthwise center axis of the helical shaft, higher linear forces along the center axis direction of the shaft can be accomplished by taking advantage of the inclined plane of the helical shape. In this way a zero backlash, high torque mechanism with only one moving part can be constructed with precise control.

Figure 19:
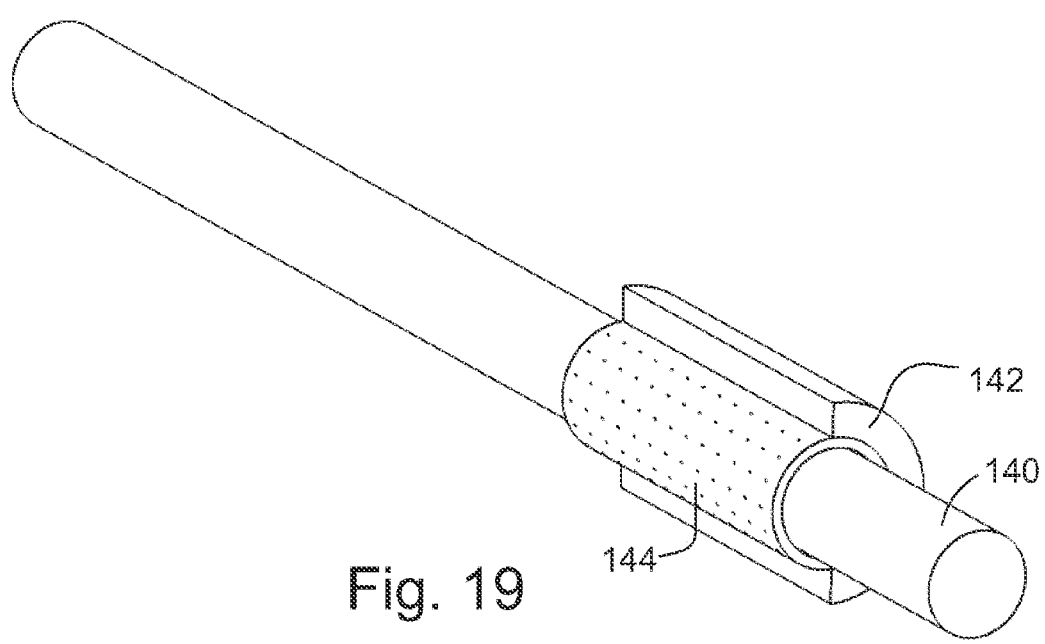
FIG. 19 is a simplified cross-section schematic of a cylindrical drive embodiment of a motion producing device.

Example of cylindrical actuator embodiment: FIG. 19 shows a simplified schematic cylindrical drive embodiment with a sectioned housing/reference member 142. By expanding the shape change actuation member 144 and causing it to expand and contact the cylinder in one or more, and preferably three or more patches, and then changing the position of the energized zones, in a linear and/or circular direction, the cylindrical shaft 140 can be caused to move in a linear direction and or in a rotating motion. By using a square, rectangular, or triangular shaft, linear motion can be generated while ensuring that no rotary motion occurs. A part of a cylinder with infinite radius forms a plane, and linear members within the plane then can be caused to translate with respect to each other according to the principle disclosed here. The patches or energized zones may be formed as a grid, as shown.

Figure 20:
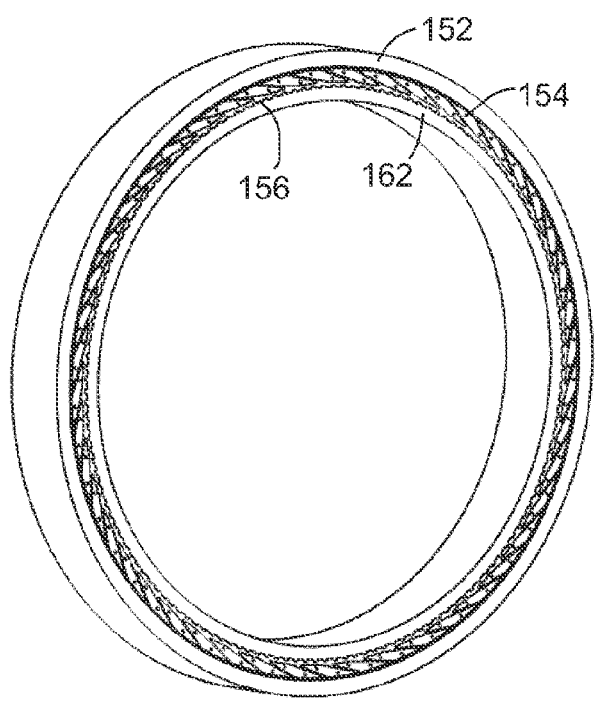
FIG. 20 is a simplified schematic of an embodiment of a motion producing device with a reinforced actuator ring construction.

Example of reinforced actuation member embodiment: FIG. 20 shows a simplified exemplary embodiment of a motion producing device with an outer ring or output member 152, an inner ring or reference member 162 and an actuator ring or member reinforcement construction which is designed for radial compliance and increased tangential rigidity. The reinforcement member 156 is preferably made of a material with a higher tensile and/or compressive strength and/or tensile and/or compressive rigidity than the shape change material in the chambers or flexures 154 between the reinforcement members. This is an example of many different possible configurations that are conceived by the inventor and which benefit from the principle shown here whereby elastic deformation of the reinforcement member in the radial direction by energizing the shape change actuation material applies a primarily bending stress on the reinforcement member rather than a tensile or compressive stress. Tangential load on the contact surface will, as a result of the angled reinforcement features 154, apply more of a compressive and or tensile stress on the reinforcement member. The reinforcement flexures 154 extend radially outward and slant circumferentially through the expandable material 156.

Figure 21:
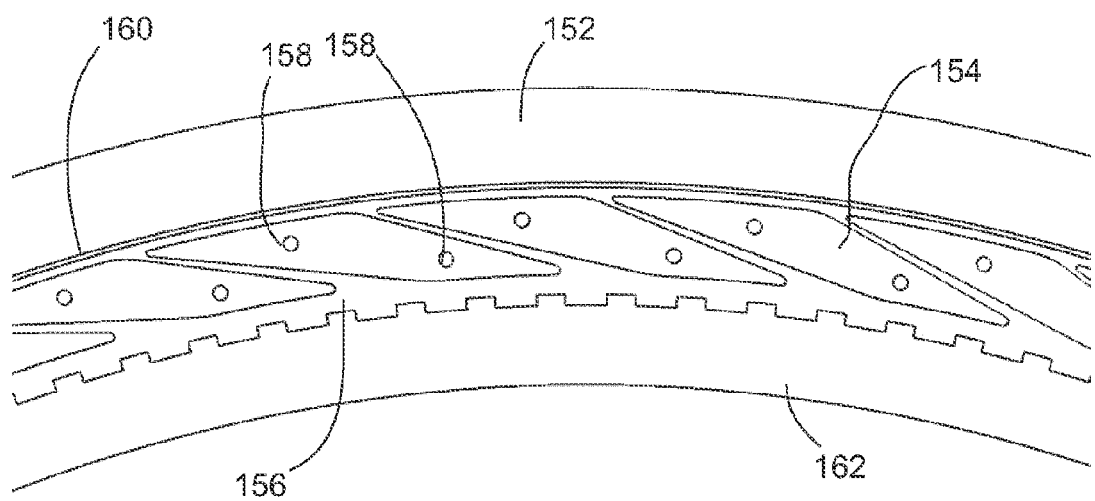
FIG. 21 is a simplified partial section of the motion producing device embodiment of FIG. 20.

As shown in FIG. 21, reinforcement member chambers 154 can have one or more electrodes 158 and/or other energizing features/connections. Energizing all or part of the shape change material in the reinforcement member chambers will close the gap 160 between the reference member contact surface and the output member contact surface. Radially expandable reinforcement member 156, shown in FIG. 21 in the relaxed position, is mechanically connected and/or bonded to the reference member 162, and also preferably serves as the contact surface with the output member 152.

A non-limiting example of materials which could be used in this configuration including an output member of aluminum, of reference number of aluminum, a radially expandable reinforcement member made of nylon, and a shape change material in the reinforcement member chambers made of silicone electroactive material.

When the electroactive material, in this example, is energized in a zone with a non-energized his own on either side (this can be accomplished by energizing one or more sets of electrodes) it will expand in the radial direction and cause the radius of the reinforcement member contact surface to decrease as it moves radially to contact the contact surface of the output member.

This is considered to be a preferred construction as it does not require the shape change material to exhibit high shear stress strength or rigidity. It also provides a very rigid and secure attachment of the flexible composition's structure of the reinforcement member and actuation shape change material to the reference member This embodiment can also be configured with the radially expandable reinforcement member and expandable (and possibly contactable) shape change actuation material on the outer member with the output member as the inner race.

Spiral arc coupling: Any wave, whether in a liquid or in a solid, will cause the surface to travel in a somewhat circular or elliptical path. This circular path is one of the motion transfer principles of the Reactuator, and it is preferable to allow it to happen, at least to a certain extent. At the same time, the expandable material reinforcement structure must allow torque to transfer from the contact surface of the OD of the actuation member to the inner reference member. This coupling member structure:

1. Must allow the OD of the actuation member to travel in a somewhat circular or elliptical path as the wave propagates.

2. Must transmit torque from the outer surface of the actuation member to the reference member.

An inherent characteristic of this coupling is that it causes a somewhat circular or elliptical path of a point on the contact surface as the wave propagates, and a near radial movement of a point on the contact surface radially outward from, and near the center of, an energized (or group of energized) actuation member zones when a wave is formed (as opposed to when a wave propagates).

Figure 22:
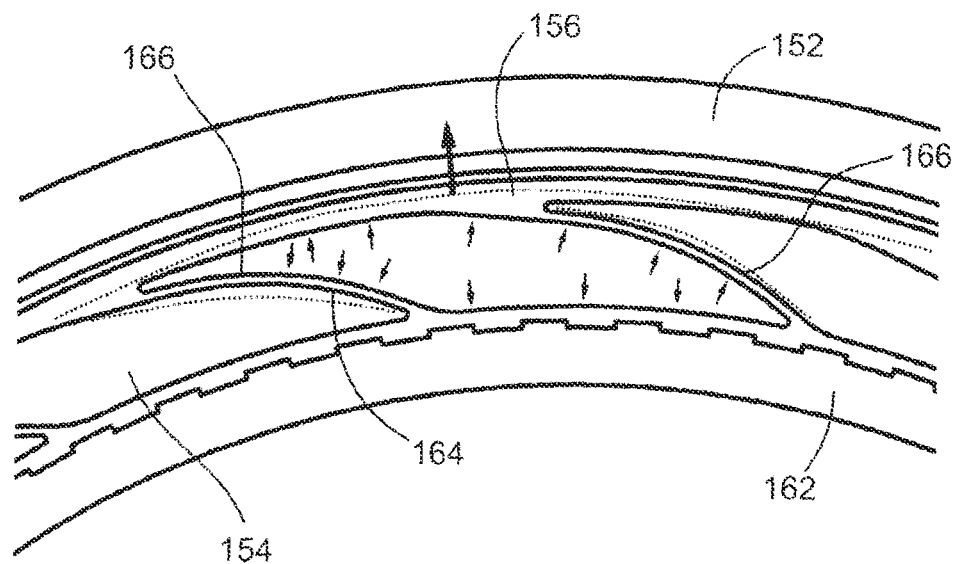
FIG. 22 is a simplified schematic of an embodiment of a motion producing device with a reinforced actuator ring with non-radial flexures.

Non-radial flexures 164 as shown in FIG. 22 allow the outer surface of the actuation member 156 to move outward. They also allow the transfer of torque from the traction contact surface interface to the inner reference member 162. A non-radial straight flexure will cause a rotation of the outer surface of the actuation member generally around the inner attachment point of the flexures. This is non-ideal because it does not allow a natural movement of the outer surface radially outward when one cell is energized or in a somewhat circular or somewhat elliptical motion when the wave propagates.

By using reinforcement flexures with an arc shape as shown in FIG. 22, the pressure generated in all directions (generally radially outward from the center of each chamber) by the ER material when it is energized or by external pressurization of chamber material, will act on all the interior surfaces of the pocket/cell/chamber that contains it. In this example, one chamber is energized and the dotted lines show the resulting deflection of the reinforcement flexures. The pressure in the chamber has an increasing mechanical advantage on the left (convex relative to the pressurized material) flexure 164 as it straightens, and a decreasing mechanical advantage on the right (concave relative to the pressurized material) flexure 166 as it flexes. As a result, the left convex flexure will see a higher displacement (from curved to straight) and this will act on the outermost material of the coupling to counteract the tendency of the non-radial flexures to rotate the OD of the actuation member as it moves radially outward from the expansion force caused by internal pressure. This expandable reinforcement member structure can be used in various configurations with any of the embodiments disclosed including linear and other motion path shapes It is anticipated by the inventor that variations of the different features shown in the examples of different embodiments of a motion producing device in this disclosure can be combined with variations of different features of other embodiments in this disclosure for various effects and benefits.

One of the most significant features of at least some embodiments is the direct and nonrotating connection between the contact surface of the reference member with the reference member. Essentially, this achieves an actuator (which can also be used as a motor) (which may, in certain configurations, even be usable as a generator) with minimal moving parts. The rest of the movement that is required to achieve rotation or other types of movement of the output member is accomplished by changing the shape of the reference member contact surface.

The motion producing devices in one embodiment disclosed here takes advantage of high speed action shape change materials and combines these materials with a method of achieving high surface contact area and pressure to produce rotary and/or other types of motion from a simple, and cost effective device.

Increasing the speed of movement of the contact patch against the output member will increase the speed of the output member. Increasing the electrical current (or other actuating energy, depending on the type of shape change material used for the actuating member) will increase traction and output torque.

The use of high surface contact material or surface preparation such as very fine hairs (such as microfibers or microfilaments used by geckos for traction) can be used on one or both contact surfaces to increase traction and reduce the required compression force and contact area. This actuator is considered ideal for many extremely large applications as well as for many small applications including MEMs.

If constructed with opposing tapered walls for integrated bearing support of the output member, a slightly different taper may be necessary on rigid and flexible rings to allow non-sliding contact.

Other actuation methods for the actuation shape change material including but are not limited to, a matrix of electrical wires which are able to exceed a critical threshold voltage of the material they are connected to where two or more energized wires cross. The preferable material or coating has a limited reaction below this voltage, so the reaction zone can be manipulated in any direction on a flat plane or on the surface of a sphere, for example, or to produce rotary and or axial motion of a rod in a cylinder.

In an embodiment of a motion producing device there is disclosed the use of a contact surface which can be made to pull away from and/or to come into contact with the output surface by energizing and/or de-energizing portions of the actuation member to generate one or more contact points against the output member which can be moved in one or more directions along the contact surface if the output member.

The reactive material or structure can also be configured to pull away from being in contact with the contact surface of the output member when energized.

Some embodiments of a motion producing device can use any type of material or structure presently known our existing or known or existing in the future which reacts to an input signal such as a change in voltage, and/or a chemical input, and/or a light signal input, and/or a heat signal input, and/or gas pressure, and/or hydraulic pressure, and/or mechanical means such as rollers and or spheres and or gears which cause one or more contact patches to move along a contact surface if an output member.

Micro machines using this principle can be manufactured using mems techniques for micro, miniature, or even nano machines. Electricity supplied by one or more wired or wireless methods with wirelessly controlled switches at positions on an actuator member may be used to control the position and energizing of movable zones on the actuator member.

Other types of materials which may be useful for the actuation of shape change material, depending on the embodiment, include but are not limited to the following: nano fiber piezo materials, expanding and/or contracting gels, peizoelectric materials, magnetostrictive materials (magnetic field causes contraction/expansion), photostrictive (light exposure causes contraction/expansion), shape memory alloys, shape memory polymers, electrochemomechanical polymers, electroactive polymer, electrostricter polymer, mechano-chemical polymer/gel, expanding and or contracting meta-materials, electrostatic actuation materials, structures which exaggerate or amplify the effect of any of the able materials or other materials not yet known, materials or structures which are energized by gas and/or incompressible fluid pressure.

Depending on the structure and materials used and energization pattern and sequence, the output race may, in some cases travel in the same direction as the movement of the contact patch/s.

The traction or toothed surface that interacts with the driven surface of the output member is fixed to the reference member and allows deformation of the shape change (actuation) layer by virtue of elastic deformation of the shape change member material (and the traction/toothed ring material).

The present device can use an exaggerating structure, such as an array of lever arms powered by piezo's, or a tangentially rigid array with reactive material filling the voids to increase the radial motion generated by a shape change material.

A segmented or partially segmented actuation member will allow radial expansion with less deformation of adjacent areas.

Torque or force transfer from reference to output race can be radial or axial or at an angle as long as the expansible ER material is located along the line of force transfer, it is possible to maximize the contact force resulting from its expansion, and therefore, the traction force.

The ratio of the diameter of the output member to the diameter of the reference member is preferably less than 2:1 and more preferably less than 1.5:1 and even more preferably less than 1.1:1.

In some embodiments, the traction surface and contact surface may have 100% contact at all times (under contact and/or slight preload compression) and two or more traveling higher compression zones. Advantages of this include it being self-locking when the power fails. If a material which can contract radially with a negative (or the opposite) charge is used, then the Reactuator can also be free spinning if desired by contracting all of the circumference at the same time. Here, a slightly preloaded (stretched) deformable surface member is preferred where this surface is stretched outward (if attached to inner race) when at rest to achieve 100% contact when not powered, and then compressed radially outward in two or more traveling areas to cause motion . . . and then contracted (allowed to contract) by contracting the ER material around complete circumference.

Some embodiments, that are not restricted by a particular claim to an actuator member, may use any means of compressing or deforming the surface as a result of any type of actuation which makes the surface, or a subsurface member not round in one or more places so as to elongate the contact surface between the ID and OD.

This method of elongation can be magnetic components that pull together and deform a material such that it pushes outward on the OD of the inner member or a subsurface of the OD of the inner member. The same could be accomplished by deforming the ID of the outer member.

The motion producing principle may also be used for a linear actuator. Either inside a tube or at least two opposing surfaces. There needs to be two rigid or semi-rigid opposing members that prevent full expansion of the contact surface or sub surface such that a high (or adjustable) contact force is achievable.

Figure 23:
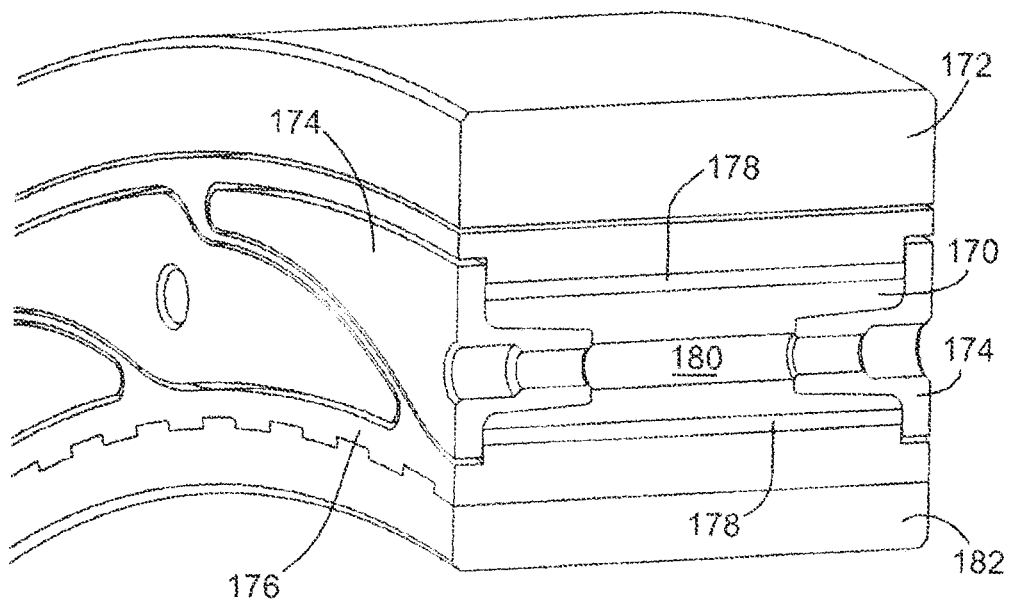
FIG. 23 is a simplified cross-section schematic of an embodiment of a hydraulically actuated motion producing device.

FIG. 23 shows a preferred embodiment of a hydraulically or pneumatically actuated version of the Reactuator. In the hydraulic, pneumatic or electromagnetic and other embodiments, the expandable material need only be a material that can be expanded, stretched or moved outward away from or towards a surface, so for example the confining walls of a chamber and the material of the actuator member around the chamber, and need not be an inherently expandable material such as an electroactive material. Various fluids, whether incompressible or compressible, may be used for or in place of the hydraulic fluid. The hydraulic or pneumatic version can work by expanding by pressurizing or contracting by depressurizing to press or retract the traction surface of the actuator member as the case may be to or from the contact surface of the output member.

The center member 170 is preferably a low durometer flexible material such as but not limited to 40 durometer silicone or urethane with a high Poisson's ratio such as but not limited to 0.48 or higher, urethane which does not compress significantly when it deforms under pressure or force. The side plates 174 are shown as separate segments but can also be connected and are a rigid material such as metal or plastic. The seal member 178 is a high durometer flexible but preferably not compressible material such, but not limited to 90 A silicone or urethane. When hydraulic flow and pressure are increased in a cell, the cavity 180 in the urethane center member 170 expands outward and the outer surface of the center member 170 insert expands against the inner surface of the seal member 178. The seal member 178 is high enough durometer that it is sealed from extruding past the side plates 174 where they seal against the actuation member 176. The actuation member 176 is between an outer ring 172 and an inner ring 182. The seal member 178 has less deformation for a given actuator member cell expansion than the center member 170 so a higher durometer urethane is not highly stressed here.

Apart from the power needed to deform the urethane, this configuration will exert the same pressure on the actuator member 176 (and will result in the same traction between the actuator member and the output member contact surface) as if the cell was filled with hydraulic fluid, except the urethane is easy to "seal" and it also acts as a zero leak seal for the hydraulic fluid.

Advantages of this system include the potential for extremely high torque with a consistent torque thru the entire range of motion as compared to a typical hydraulic actuator system (such as on an excavator that has a constantly changing lever arm). There are also no sliding seals exposed to hydraulic pressure or fluid.

Figure 24:
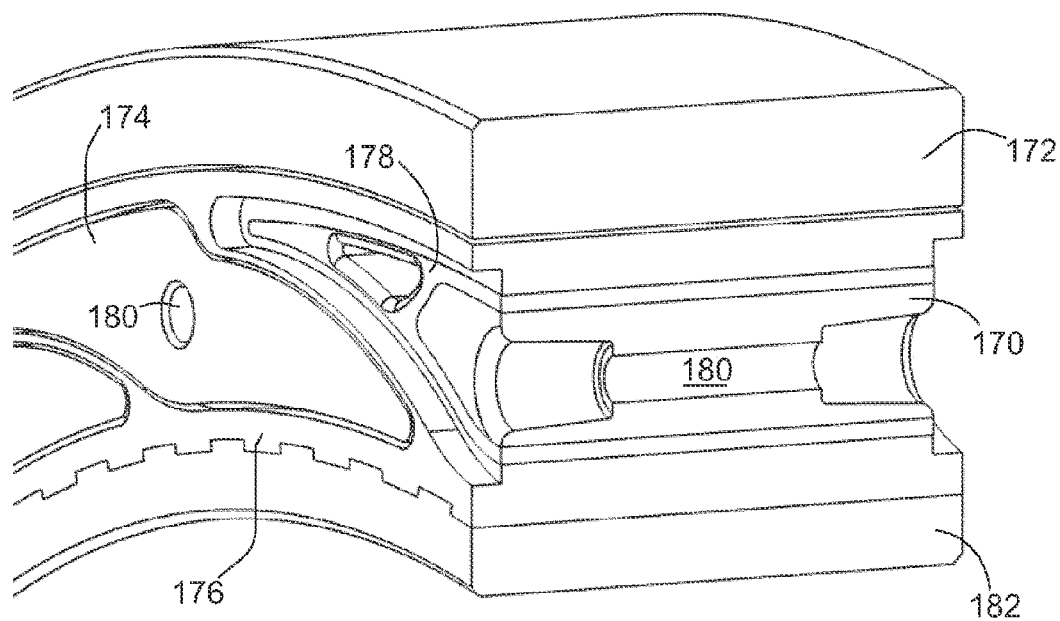
FIG. 24 shows the embodiment of FIG. 23 with the side plates removed.
Figure 25:
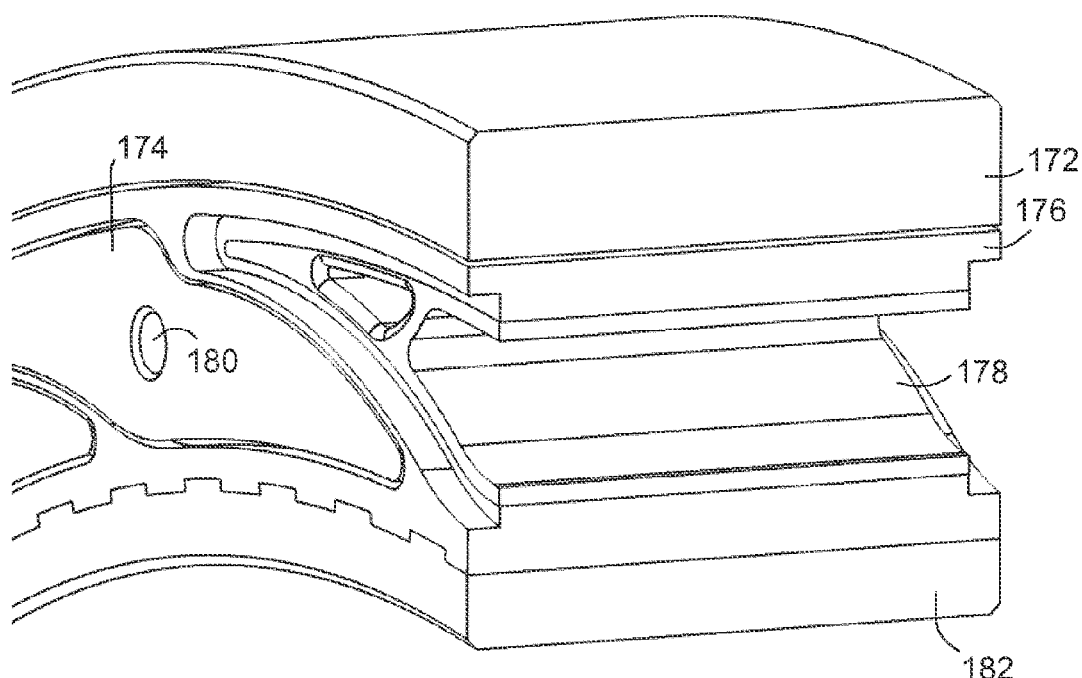
FIG. 25 shows the embodiment of FIG. 24 with the center member removed.
Figure 26:
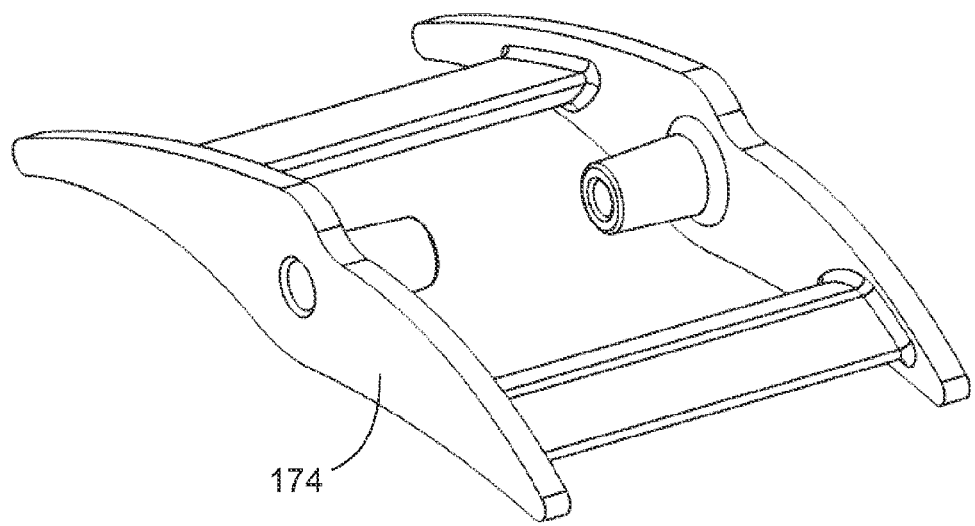
FIG. 26 shows the side plates of the embodiment of FIG. 23.

FIGS. 24-26 show the hydraulic drive configuration sequentially disassembled, first with the side plates removed, as shown in FIG. 24, then with the center member removed, shown in FIG. 25. FIG. 26 shows the side plate assembly 174, with the attachment of the two halves together not shown.

Figure 27:
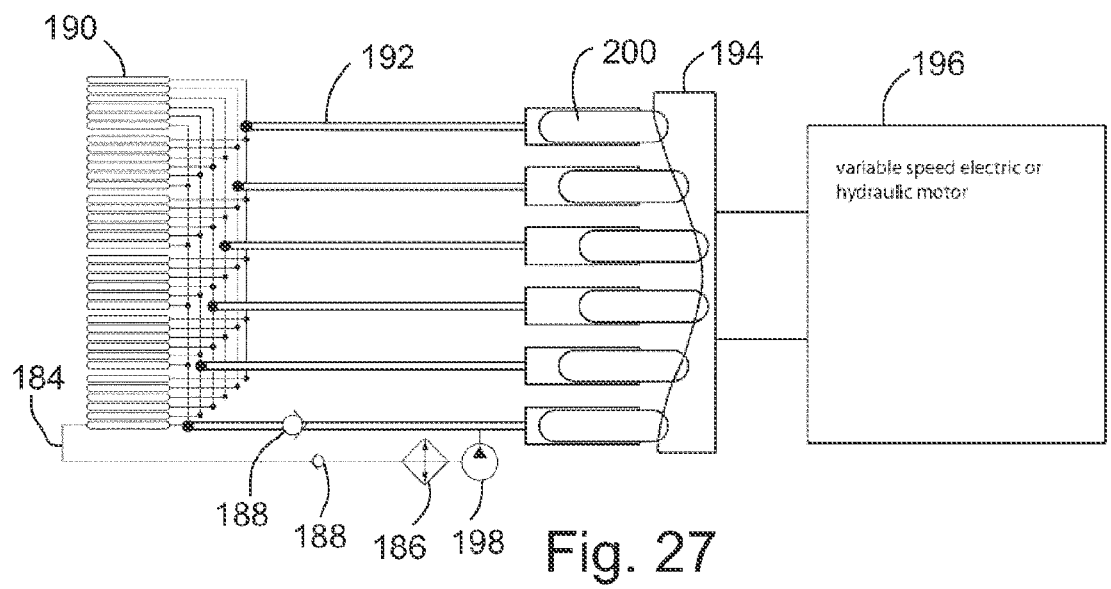
FIG. 27 is a schematic of a hydraulic circuit of an embodiment of a hydraulically actuated motion producing device.

Referring to FIG. 27, Motor 196, for example a variable speed electric or hydraulic motor, drives a swashplate pump 194. Each piston 200 of a swashplate pump 194 supplies an array of equally spaced Reactuator cells 190 through hydraulic supply lines 192. The swashplate pump 194 preferably uses variable displacement of the pistons. Each cell 190 (or set of equally arrayed cells so one inlet and outlet valve could drive two or more equally arrayed cells around the actuator) could be controlled by inlet and discharge valves but a more efficient drive would use a hydraulic motor with a single piston supplying flow and pressure to each set of equally arrayed cells. In this way, the energy in the fluid after max pressurization of the cells will be recuperated to a certain extent by driving the pump piston after top dead center (as a motor). An electric motor could be used to drive the pump and control the cell actuation speed and therefore the output speed of the Reactuator. The pressure of the system will be controlled by the displacement of the variable displacement pump. The speed of the actuator output will be controlled by the speed of the electric (or other) motor input. A cooling circuit 184 including heat exchanger 186 may be in fluid connection with the cells 190 and hydraulic supply lines 192. A separate cooling circuit is required for each piston driven circuit. The fluid may be circulated through the heat exchanger 186 by check valves 188, or by circulation pump 198. The cooling circuit is unnecessary if the actuator structure provides sufficient heat exchange.

Figure 28:
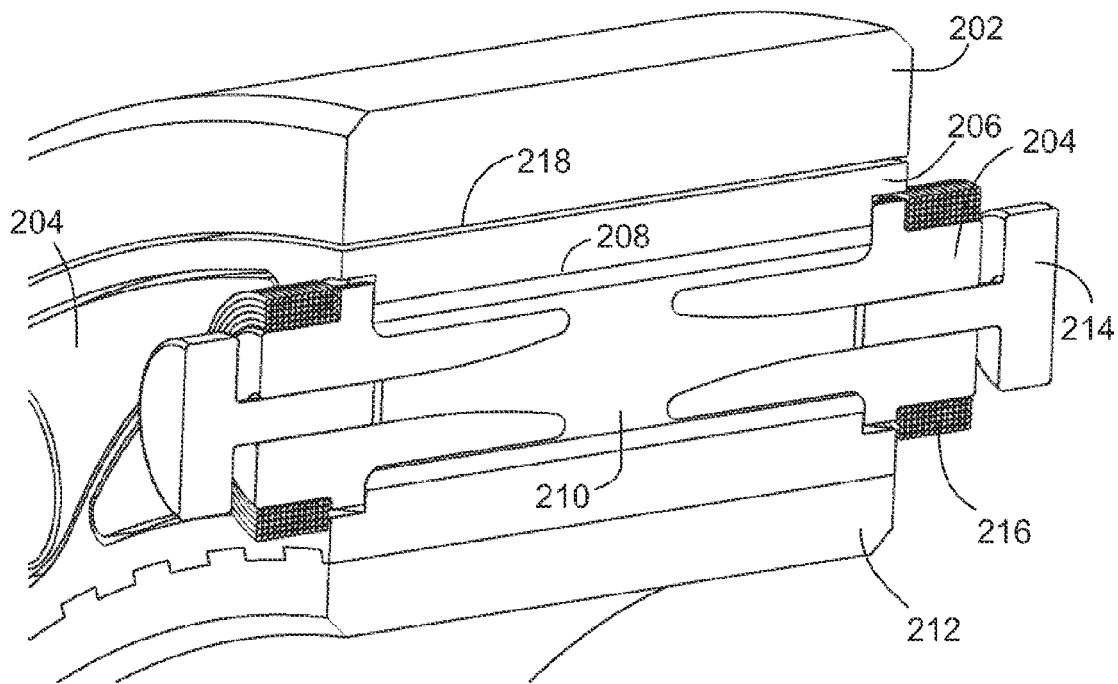
FIG. 28 is a simplified cross-section schematic of an electromechanical actuation embodiment of a motion producing device.

FIG. 28 is a simplified schematic cross-section of electromechanical actuation of the Reactuator. In the embodiment shown in FIG. 28, an electro magnet 216 is used to displace a center member 210, a small volume of low durometer non-compressible flexible material such as, but not limited to, 40 durometer urethane. By using a small piston and a large electromagnet, the pressure developed can be extremely high. With a very small gap 218 between the actuation ring 206 and the ID face of the output ring 202 (or a very thin compressible and/or deformable member in the 100% contact embodiment) very small volume displacements of the urethane can produce very high traction forces as the result of small actuation member deflection. Actuation ring 206 may be mechanically connected to the reference ring 212.

The magnet is preferably configured so the magnetic force will be the highest when the cell pressure also needs to be the highest. This is a particular advantage of this system with regard to power density as compared to an electric motor which has an output torque which is an average of the weakest and strongest positions of the electromagnetic coils and magnets or inductance members.

The higher durometer seal member 208 material (such as, but not limited to, 90 durometer urethane) acts like a backup ring, similar to the hydraulic actuation embodiment to prevent extrusion of the lower durometer urethane material past the sidewall seals 204 and the piston ring seal member 208.

Another advantage of this actuation method over the hydraulic system is the elimination of hydraulic fluid, the elimination of a hydraulic pump and hydraulic lines. Very high frequency movement of the magnets should be possible. It may even be possible to recapture some of the rebound energy on the backstroke of the piston by inducing a current or using a permanent magnet in the piston driver 214.

Figure 29:
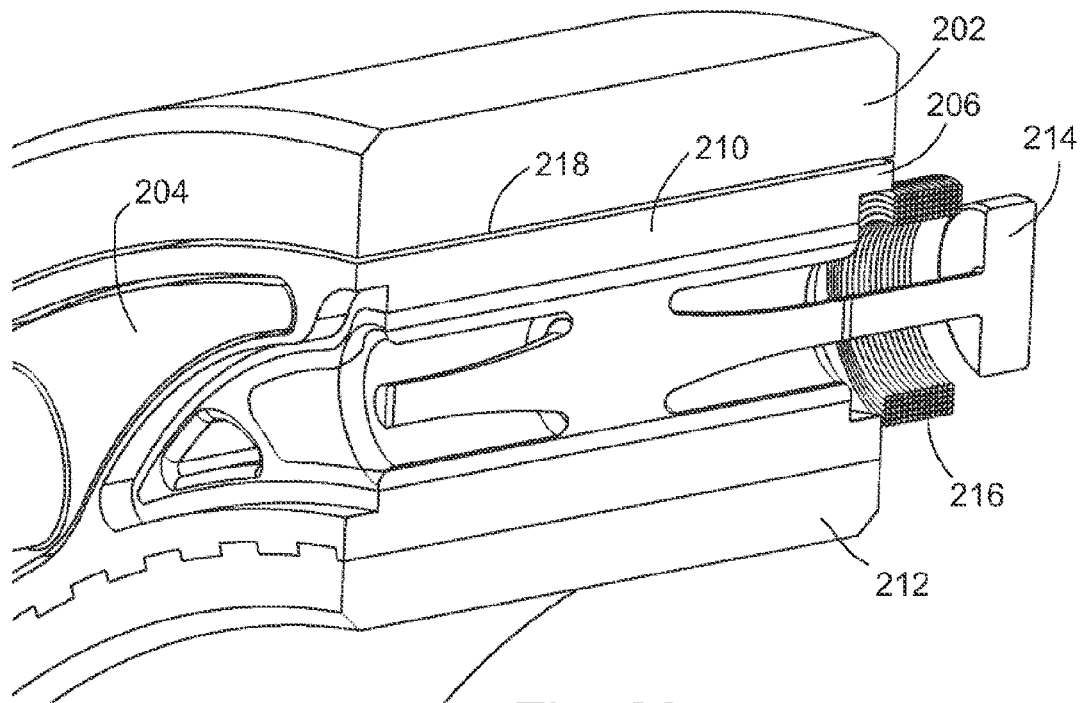
FIG. 29 shows the embodiment of FIG. 28 with the side plates removed.

FIG. 29 shows a simplified schematic cross-section of the electromechanical actuation of the Reactuator partially disassembled showing the low durometer urethane center member 210 and how the piston displacement will get transferred to the larger volume of urethane (which could be several pieces of different durometers or all one piece but this is a preferred example of how it could be configured). The purpose of the gradually flaring tube in the sidewall member 204 is to transmit the motion of the small diameter piston to the larger volume of the low durometer urethane without exceeding elastic limit of the urethane at any one point. It is a method of transmitting relatively high velocity urethane displacement over a small surface area (at thee piston) to a much lower velocity urethane displacement over a much larger cross-sectional area (at the large end of the flared section). Some sort of lubricant between the urethane and the flared section is preferred, including the use of a self-lubricating material.

Figure 30:
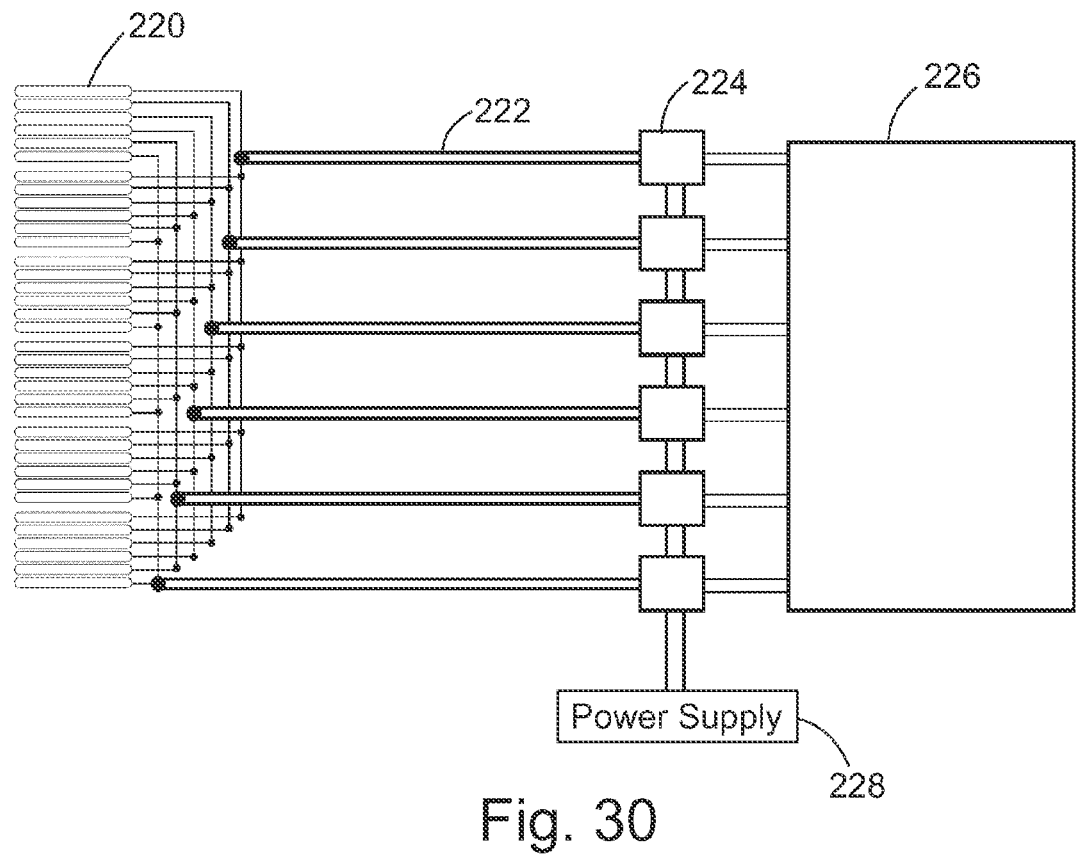
FIG. 30 is a schematic of an electrical circuit of an embodiment of an electromechanical actuation motion producing device.

Referring to FIG. 30, an energy source for activating an electroactive material such as a polymer or elastic material is shown in an electrical schematic. On the left side elements 220 are Reactuator cells with electrodes (as shown in the embodiment of FIG. 1) or coils (as shown in FIG. 29) coupled by wire pairs 222 to relays or power control circuits 224. Each relay 224 and wire pair 222 energizes an array of equally spaced electrodes or coils. A simple timing unit 226 formed of a programmed CPU or hardwired circuit controls timing power from power supply 228 to each relay 224 to energize the arrays sequentially.

FIGS. 31-34 show a simplified schematic of a rotary actuator with a rigid inner reference ring 242, a rigid outer output member 232, and an electro-reactive actuation ring 234 with two or more arrays of electrodes 238 at different radial distances from center. Dark electrodes indicate energized electrodes. In the embodiment shown in FIGS. 31-34 the output member rotates in the same direction as wave propagation.

Figure 31:
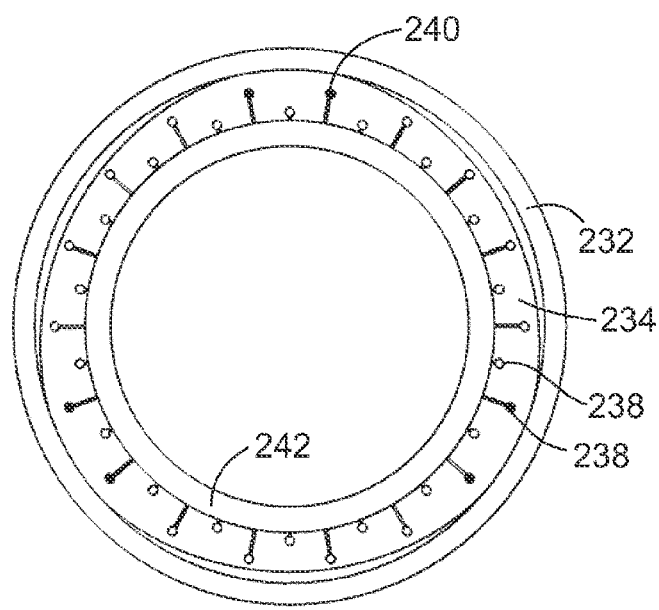
FIG. 31 is a schematic of a rotary embodiment of a motion producing device with multiple arrays of electrodes in a first phase of the actuation sequence.

Actuation sequence: FIG. 31 shows Phase 1, where two or more preferably equally arrayed zones are energized as indicated by the dark electrodes (three zones are shown in FIG. 31 as an example but fewer or more zones may be used). Different types of electro-reactive materials may contract or expand along the direction of which the voltage is applied. For this example the voltage is applied from electrodes on one axial side of the electro-reactive ring 234, to identical electrodes on the opposite axial side (not shown). In FIG. 31 one or more of the outer array of electrodes in each zone are energized 240 to contract the continuous actuation ring axially so that it expands radially outward to create contact with the outer race 232.

Figure 32:
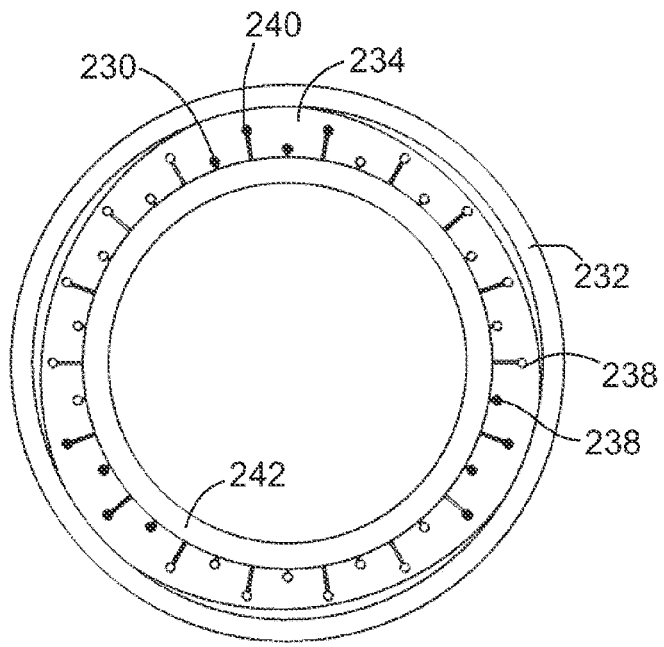
FIG. 32 shows the embodiment of FIG. 30 in a second phase of the actuation sequence.

FIG. 32 shows Phase 2, where energizing one or more of the inner array electrodes 230 to the left of the outer energized electrodes 240 contracts the actuator ring material 234 to the left by increasing tension from the outer energized electrodes 240 inwardly and in the direction of wave motion. The contact patch between the actuator ring 234 and the outer ring 232 then progresses counterclockwise, in this example, transmitting relative motion from the reference race 242 to the outer race 232.

Figure 33:
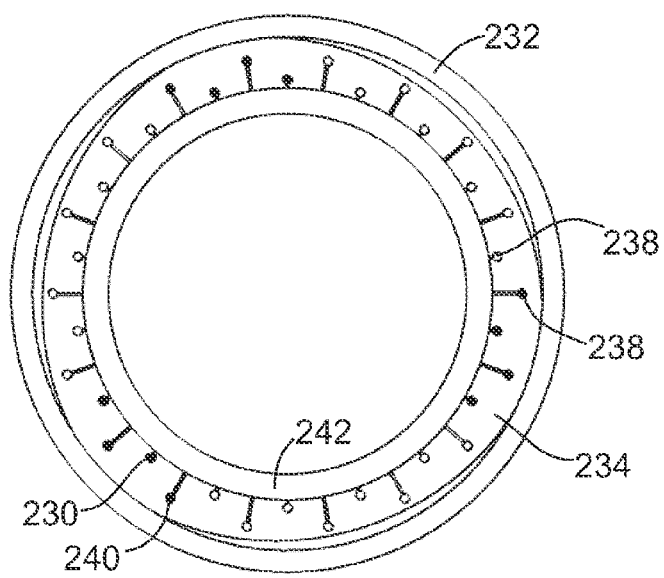
FIG. 33 shows the embodiment of FIG. 30 in a third phase of the actuation sequence.

FIG. 33 shows Phase 3, where electrodes 238 are progressively energized at the leading edge of the wave and de-energized along the trailing edge of the wave in a pattern that generates radial expansion to achieve contact pressure against the outer race 232.

Figure 34:
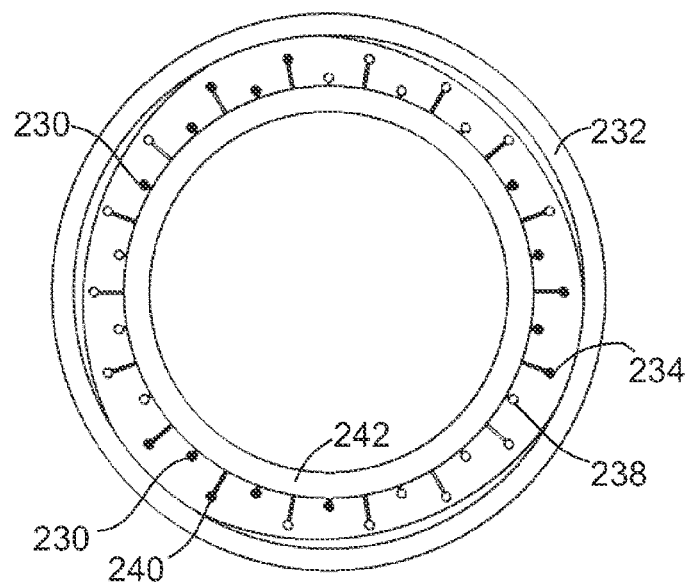
FIG. 34 shows the embodiment of FIG. 30 with additional energized electrodes ahead of the wave.

As shown in FIG. 34, depending on the characteristics of the material, circumferential tension can be developed by energizing additional electrodes on the inner array 230 ahead of the wave with a counter-clockwise progressing wave.

Many other combinations of electrodes energizing are possible and have been conceived by the inventor. Materials which expand in the direction of voltage, or expand or contract depending on the polarity of the energization, can be energized and a variety of patterns which accomplish the following to principles of this device.

Radial force between the actuation ring and the output race results from energizing two or more zones so that contact pressure is achieved or increased against the outer race in these zones.

The internal stress of the actuation ring is increased and/or decreased circumferentially to cause a progression of the wave crests around the actuator.

Figure 35:
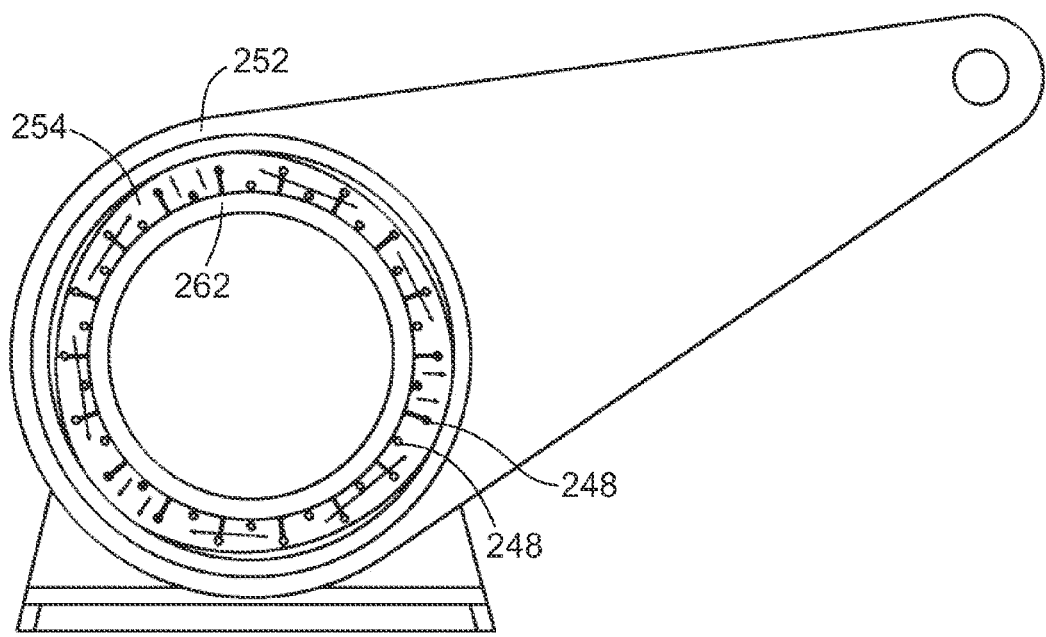
FIG. 35 is a schematic of a rotary embodiment of a motion producing device where the output member rotates in the opposite direction of wave propagation.

FIGS. 35-36 show a simplified schematic of a rotary actuator with a rigid inner reference ring 262, a rigid outer output member 252, and an electro-reactive actuation ring 254 with two or more arrays of electrodes 238 at different radial distances from center. In the embodiment shown in FIGS. 35-36 the output member 252 rotates in the opposite direction of wave propagation.

Referring to FIG. 35, electro-reactive materials have an inherent elasticity. By energizing two or more zones so the material expands radially (or in whatever direction closes the gap between the reference member and the output member) the propagation of these waves by the sequential energizing of adjacent electrodes will cause relative movement of the output member in the opposite direction of wave propagation. Un-energized areas will deform elastically to allow the expansion of the material 254 in the energized zones. Radial arrows A show the expansion of the material that is energized. Circumferential arrows B show the elastic deformation of the un-energized material.

Figure 36A:
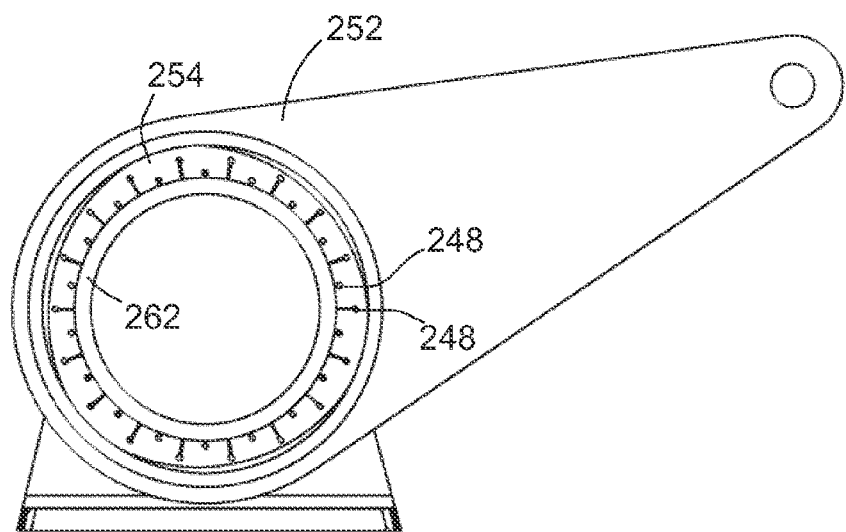
FIG. 36A shows the embodiment of FIG. 35 as the wave propagates counterclockwise.
Figure 36B:
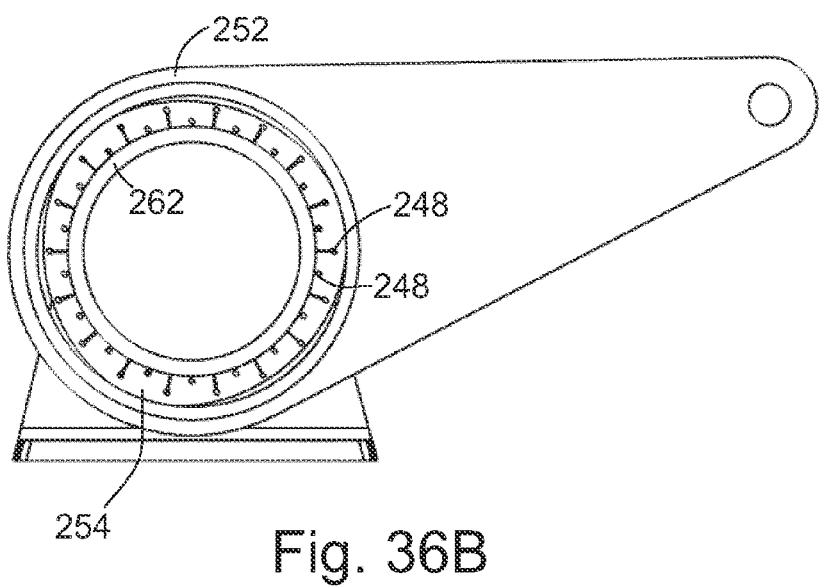
FIG. 36B shows the embodiment of FIG. 36A as the wave propagates further counterclockwise.

FIGS. 36A and 36B show and example of the progression of a wave with exaggerated movement of output 252 clockwise as wave propagates counter-clockwise.

Figure 37:
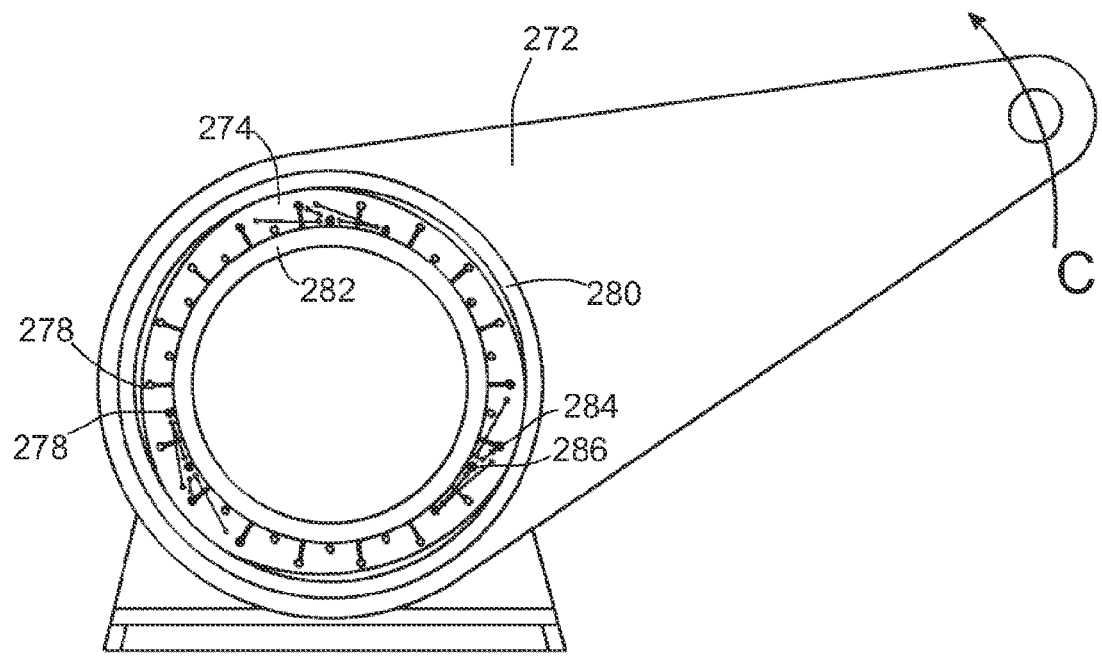
FIG. 37 is a schematic of a rotary embodiment of a motion producing device showing the principle of operation.

FIG. 37 shows a simplified schematic of a rotary actuator with a rigid inner reference ring 282, a rigid outer output member 272 with a rigid rotational output, and an electro-reactive actuation ring 274 with two or more arrays of electrodes 278 at different radial distances from center. It is, in many applications, desirable to achieve a rigid rotational output with low rotational elasticity. In these applications high rigidity can be achieved by energizing the electro-reactive material as circumferential direction and in the direction of torque transfer. In this way, a relatively elastic electroactive material such as electro-reactive polymer, can simulate a rotationally rigid material by providing a circumferential tension on the material which is proportional to the torque applied to or through the output member.

Positive and negative charges are shown in FIG. 37 as examples of how the polarity of the electrical charge can be used to cause contraction or expansion of electro-reactive material 274 in different directions. In this non-limiting example, positively charged electrodes 284 on the visible side of the actuator ring together with negatively charged electrodes on the opposite (nonvisible) axial side of the actuation ring, cause contraction of the electro-reactive ring 284 axially with the corresponding expansion of the material in the radial direction to increase the contact pressure against the output ring 280 in these zones.

At the same time, to counteract the effect of torque on the output member (indicated by Arrow C), negatively charged electrodes 286 adjacent to the wave crests and in the opposite direction of the applied torque, are energized to contract the electro-reactive material 274 circumferentially to increase the stiffness of the output contact in the direction of the torque load.

The schematic shown in FIG. 27 is intended to illustrate the principle. Electrodes 278 can be fewer or greater in number and placed anywhere on the surface or embedded in the actuation member ring 274. The ring is preferably one continuous piece but could be separate sections, layers or rings. A continuous ring as shown allows the contraction forces to be direct between any one or more electrodes to any other one or more electrodes on the same or opposite sides axially parallel to the actuator axis or had angles along a plane perpendicular to the axis or actually through from one side toward the other side of the actuator ring but at an angle which is not parallel to the actuator axis. The same principle can be applied to a non-round actuator such as the linear actuator shown here.

Figure 38:
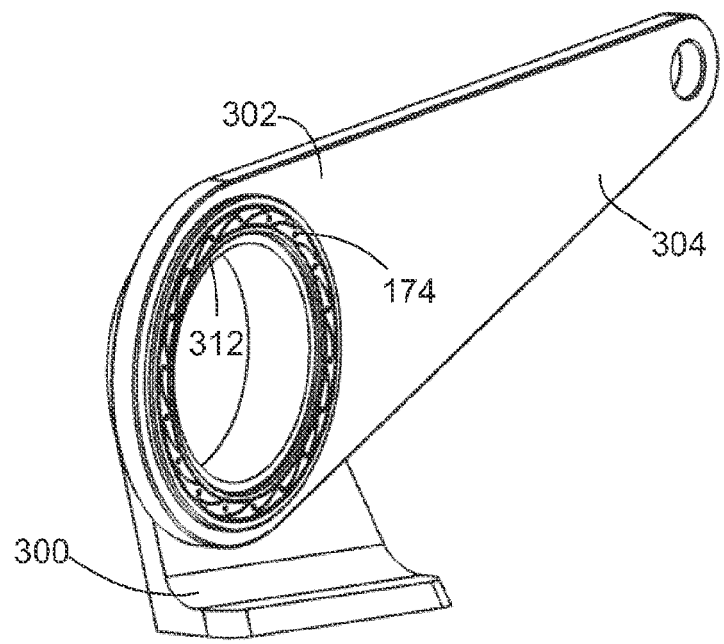
FIG. 38 is a simplified schematic of a hydraulically or pneumatically actuated embodiment of a motion producing device with an opposed tapered outer race.
Figure 39:
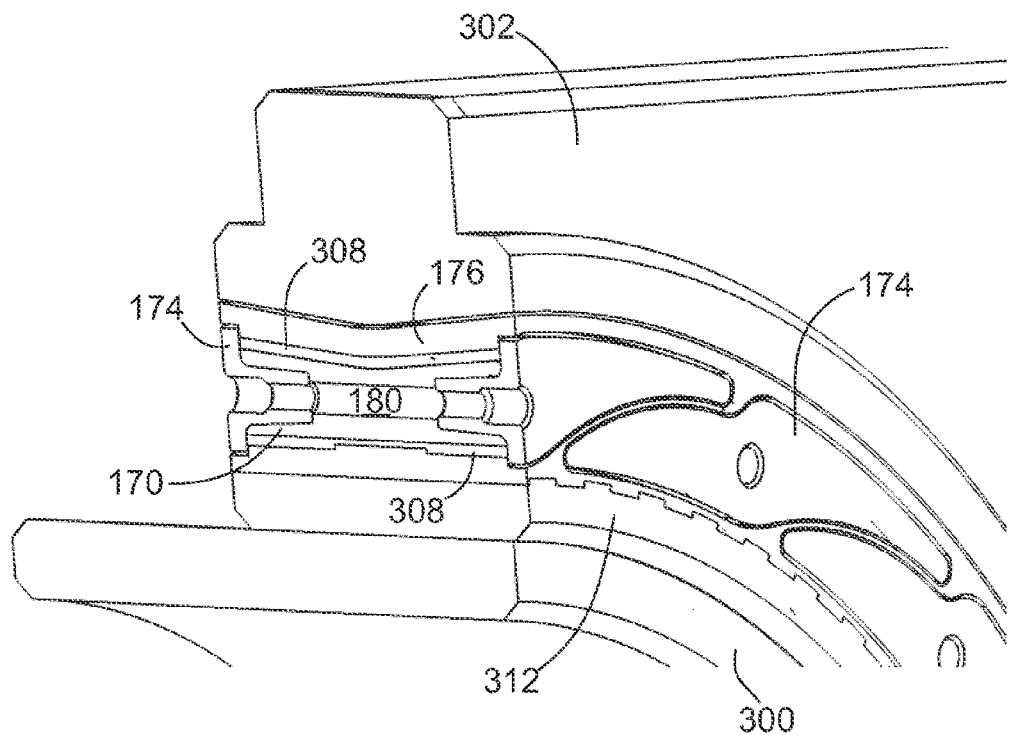
FIG. 39 shows a simplified cross-section schematic of the embodiment of FIG. 38.

FIGS. 38 and 39 show a hydraulically or pneumatically actuated version of the Reactuator made in accordance with the embodiment shown in FIG. 23 except with an opposed tapered outer race 302. The outer surface of the seal member 308 is V-shaped following the opposed tapered surface of the outer race 302. Actuation member 176 conforms to the opposed tapered surface of the outer race 302 and the outer surface of the seal member 308. Fixed stand 300 is press fit into the reference member 312 and the output arm 304 is manufactured as one piece with the output ring.

Figure 40:
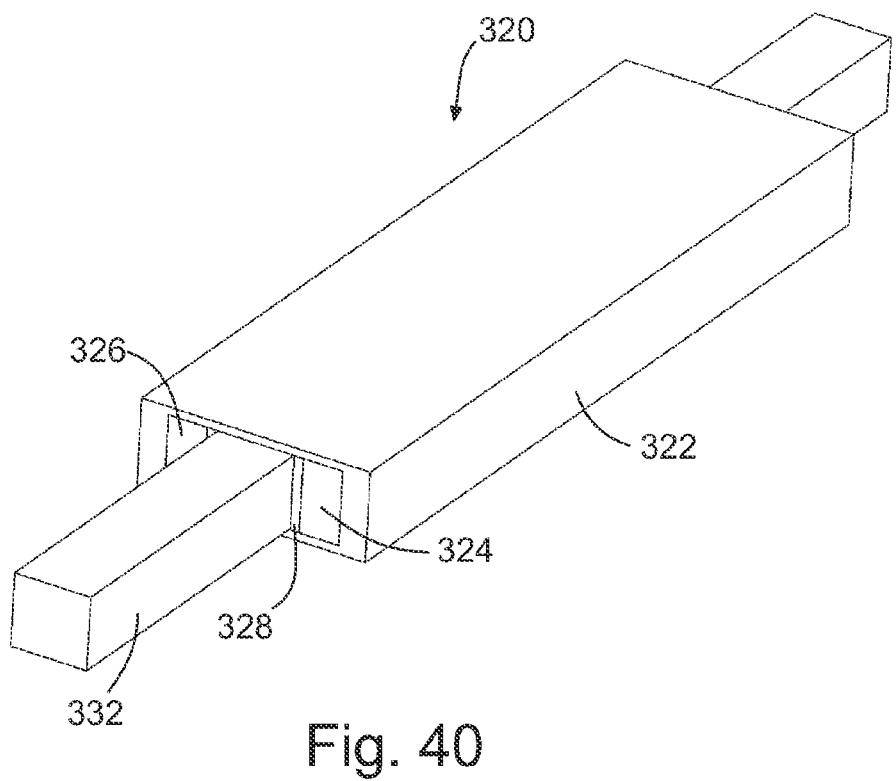
FIG. 40 is an iso view of a simplified schematic of a linear embodiment of an actuator.
Figure 41:
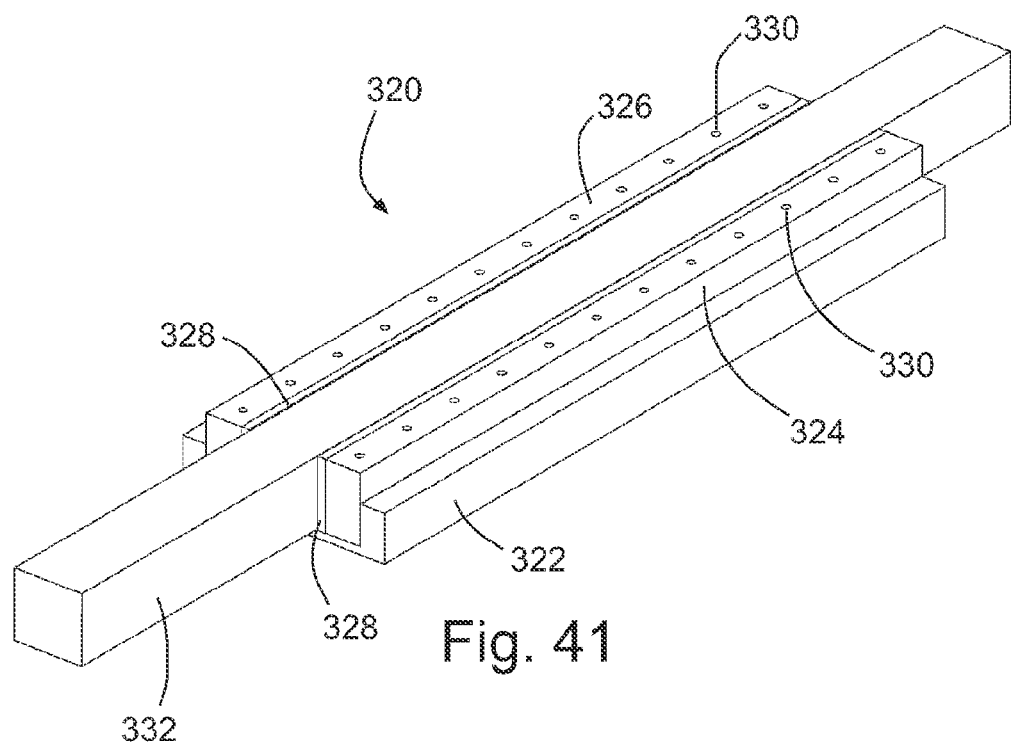
FIG. 41 shows the embodiment of FIG. 40 with partially sectioned housing.
Figure 42:
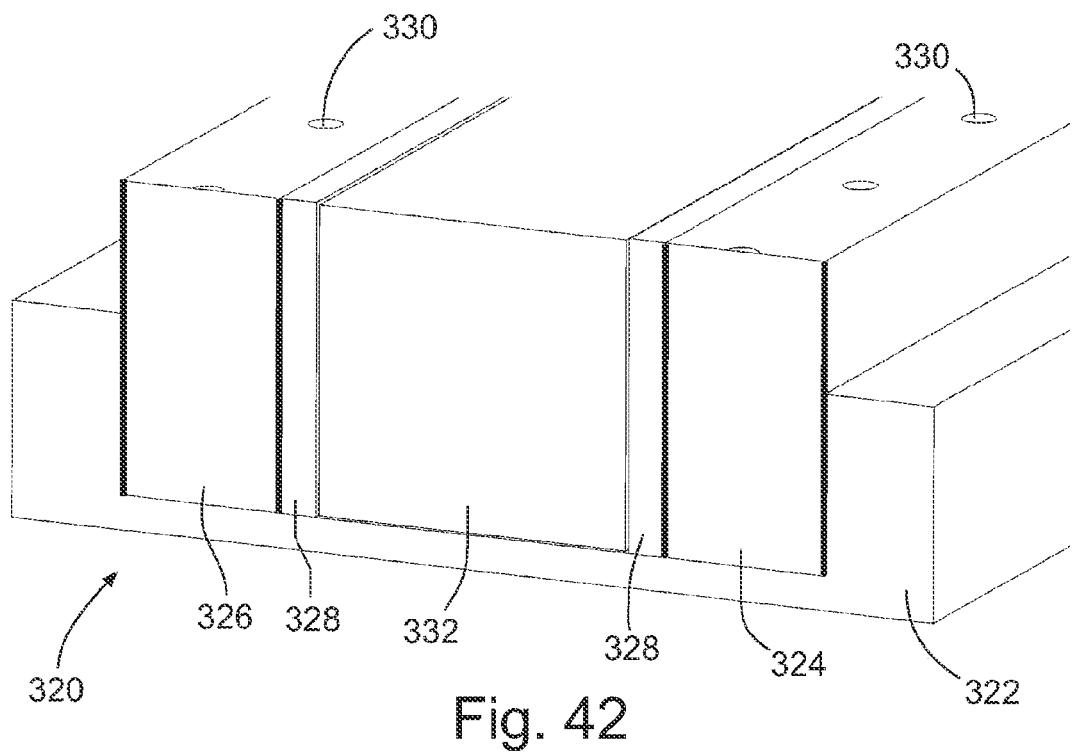
FIG. 42 shows a cross-section of the embodiment of FIG. 30 with partially sectioned housing.
Figure 43:
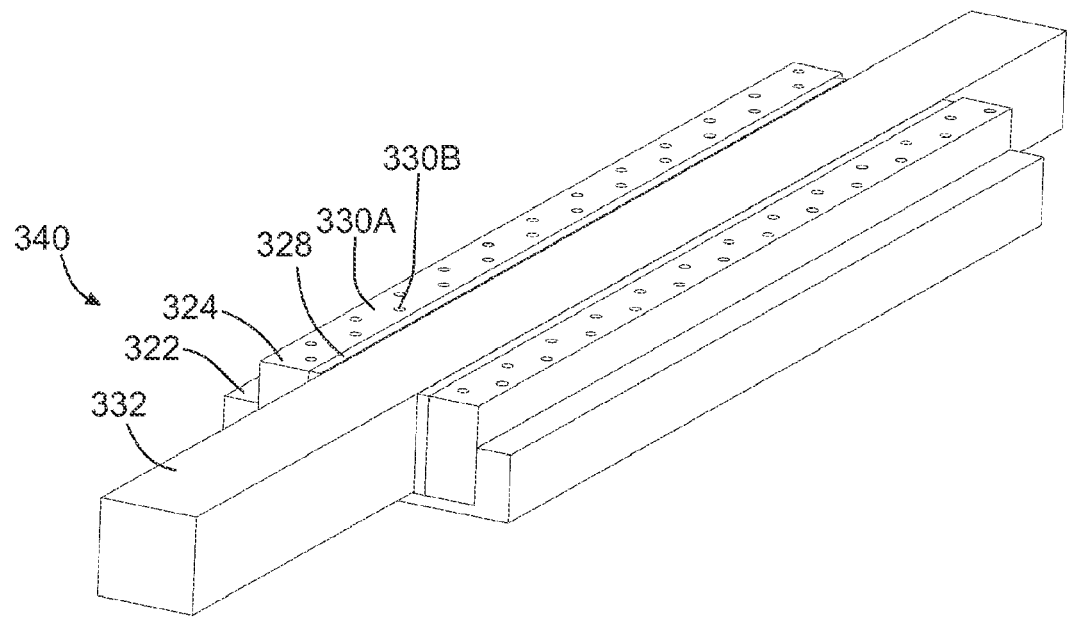
FIG. 43 shows an embodiment of a linear actuator with two rows of electrodes.

A linear actuator 320 is shown in FIGS. 40, 41 and 42. A housing 322 forms a channel and secures a first linear actuator member 324 and a second linear actuator member 326 for example, by bonding to opposed sides of the housing 322. Respective traction members 328 are bonded to the linear actuator members 324, 326. The linear actuator members 324, 326 may be made of electroactive material energized by the electrodes 330 or made of other materials using other energizing methods disclosed in this patent document. A linear output member 332 may rest on the housing 322 and be confined by the actuator members 324, 326 and their fraction surfaces 328. Lubrication or bearings may be provided for the linear output member 332 in the housing 322. The housing 322 may encase the actuator members 324, 326 as shown in FIG. 40. As shown in FIG. 43, a linear actuator 340 may have two rows of electrodes 330A and 330B.

Figure 44:
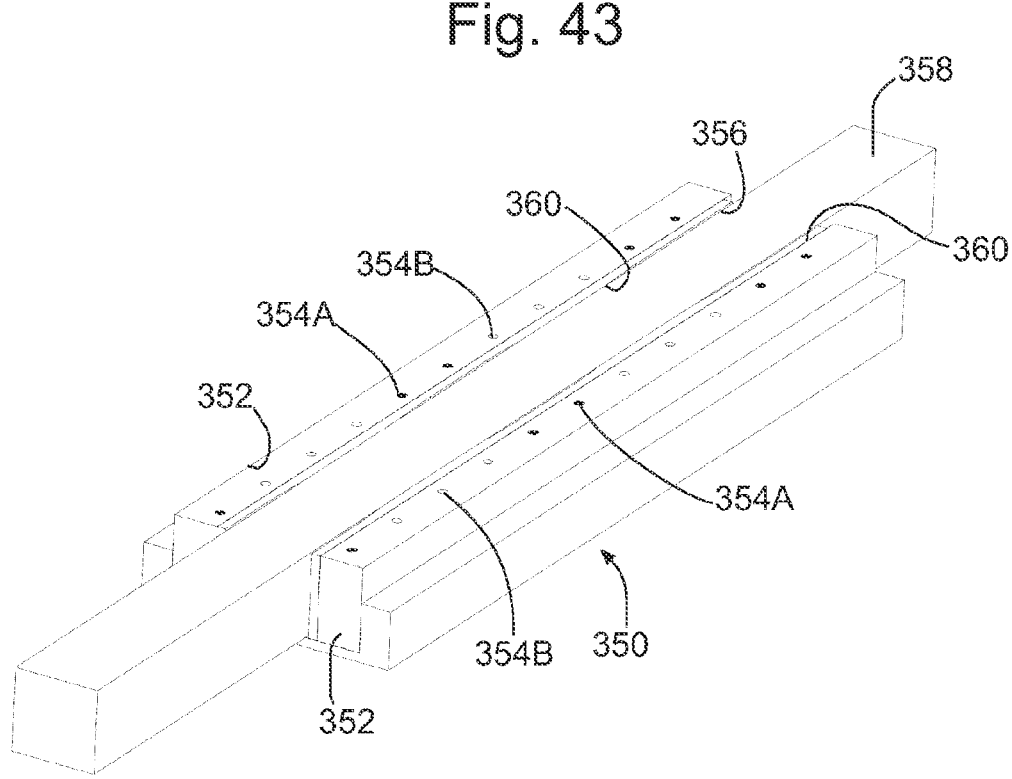
FIG. 44 shows an embodiment of a linear actuator in which the actuator member is energized to contract the material of the actuator member and pull the traction surface away from the contact surface.

FIG. 44 shows an embodiment of a linear actuator 350 in which the actuator members 352 for example by electrodes 354A (energized) and 354B (de-energized) is sequentially energized to contract the material of the actuator member 352 and pull the traction surface 356 away from the contact surfaces 360 of the output member 358.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A motion producing device comprising:
   an output member with a contact surface;
   a reference member;
   an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone; and
   an energy source operatively coupled to the actuator zones for sequentially changing the energized state of the actuator zones;
   the actuator member providing a torque transmission path between the reference member and the output member; and
   the traction surface being preloaded under compression between the output member and the actuator member.

2. The motion producing device of claim 1 in which, when an actuator zone is energized, the corresponding portion of the traction surface is in contact with the contact surface.

3. The motion producing device of claim 1 in which the output member has an axis, the reference member is concentric to the axis and the actuator zones are spaced circumferentially around the reference member.

4. The motion producing device of claim 1 in which the actuator member comprises an electroactive material that is expandable or contractable in response to an electric current and the actuator zones comprise electrodes.

5. The motion producing device of claim 4 in which the electrodes comprise at least a first array of electrodes and a second array of electrodes with the first array of electrodes disposed closer to the reference member than the second array of electrodes.

6. The motion producing device of claim 4 in which the electrodes comprise at least an inner array of electrodes and an outer array of electrodes.

7. The motion producing device of claim 1 in which the reference member is disposed inwardly of the output member.

8. The motion producing device of claim 1 in which the reference member is disposed outwardly of the output member.

9. The motion producing device of claim 1 in which the contact surface and traction surface each comprise gear teeth.

10. The motion producing device of claim 9 in which the gear teeth are rounded.

11. A motion producing device comprising:
    an output member with a contact surface and an axis;
    a reference member concentric to the axis;
    an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone;
    the actuator zones being spaced circumferentially around the reference member;
    an energy source operatively coupled to the actuator zones for sequentially changing the energized state of the actuator zones;
    the actuator member providing a torque transmission path between the reference member and the output member; and
    reinforcement flexures within and disposed around the actuator member, the reinforcement flexures extending radially outward and being slanted circumferentially through the actuator member.

12. The motion producing device of claim 11 in which the output member is at least partly spherical and the reference member is at least partly spherical to rotate within or outside of the output member.

13. The motion producing device of claim 12 in which the output member and reference member are supported on a shaft.

14. The motion producing device of claim 11 in which the reference member and output member are each cylindrical and axially movable relative to each other under forces generated by the actuator zones.

15. The motion producing device of claim 11 in which the reinforcement flexures are bounded circumferentially by respective inwardly concave and outwardly convex surfaces.

16. The motion producing device of claim 11 in which the contact surface and traction surface each comprise gear teeth.

17. A motion producing device comprising:
    an output member with a contact surface and an axis;
    a reference member concentric to the axis;
    an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone;
    the actuator zones being spaced circumferentially around the reference member;

an energy source operatively coupled to the actuator zones for sequentially changing the energized state of the actuator zones;

the actuator member providing a torque transmission path between the reference member and the output member; and the actuator member comprising a first actuator segment and a second actuator segment that are spaced apart axially.

18. The motion producing device of claim 17 in which the first actuator segment and the second actuator segment have axially tapered traction surfaces.

19. The motion producing device of claim 18 in which the respective first actuator segment and the second actuator segment taper oppositely.

20. The motion producing device of claim 17 in which the contact surface and traction surface each comprise gear teeth.

21. A motion producing device comprising:
an output member with a contact surface;
a reference member;
an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone;
an energy source operatively coupled to the actuator zones for sequentially changing the energized state of the actuator zones;
the actuator member providing a torque transmission path between the reference member and the output member; and
each of the reference member, actuator member and output member being linear.

22. The motion producing device of claim 21 in which the contact surface and traction surface each comprise gear teeth.

23. A motion producing device comprising:
an output member with a contact surface;
a reference member;
an actuator member attached to the reference member, the actuator member having a traction surface and comprising actuator zones, each actuator zone being energizable to move a corresponding portion of the traction surface to change a contact state of the traction surface with the contact surface depending on an energized state of the actuator zone;
an energy source operatively coupled to the actuator zones for sequentially changing the energized state of the actuator zones;
the actuator member providing a torque transmission path between the reference member and the output member; and
each actuator zone having an axis and further comprising confining members at respective axial ends of the respective actuator zone.

24. The motion producing device of claim 23 in which the energy source comprises a hydraulic supply, the actuator zones have hollow interiors and the hydraulic supply is coupled by lines to the hollow interiors.

25. The motion producing device of claim 23 in which the confining members comprise electromagnetic coils.

26. The motion producing device of claim 23 in which the contact surface and traction surface each comprise gear teeth.

27. A motion producing device comprising:
an output member with a contact surface;
a reference member;
an actuator member attached to the reference member, the actuator member having a traction surface and being made at least partially of an expandable or contractable material that is expandable or contractable when energized;
the expandable or contractable material being preloaded under compression between the output member and the actuator member;
the contact surface of the output member being in continuous contact with the traction surface of the actuator member; and
an energy source operatively coupled to the actuator member for sequential energization and actuation of spatially separated portions of the actuator member.

28. The motion producing device of claim 27 in which the expandable or contractable material is a polymer that is expandable or contractable in response to an electric current and the energy source comprises electrodes in contact with the expandable or contractable material.

29. The motion producing device of claim 27 in which the output member has an axis, the reference member is concentric to the axis and the spatially separated portions of the actuator member are spaced circumferentially.

30. The motion producing device of claim 29 in which the actuator member is formed of at least two segments that are spaced apart axially.

31. The motion producing device of claim 27 in which the contact surface and traction surface each comprise gear teeth.

32. A motion producing device comprising:
an output member with a contact surface and an axis of rotation;
a reference member concentric to the axis;
an actuator member attached to the reference member, the actuator member having a traction surface and being made at least partially of an expandable or contractable material that is expandable or contractable when energized;
the contact surface of the output member being in continuous contact with the traction surface of the actuator member; and
an energy source operatively coupled to the actuator member for sequential energization and actuation of spatially separated portions of the actuator member;
the spatially separated portions of the actuator member being spaced circumferentially; and
the contact surface of the output member and the traction surface each having cooperating helical shapes to convert rotation of the output member into linear motion.

33. The motion producing device of claim 32 in which the contact surface and traction surface each comprise gear teeth.

34. A motion producing device comprising:
an output member with a contact surface and an axis of rotation;
a reference member concentric about the axis;
an actuator member attached around the reference member, the actuator member having a traction surface and being made at least in part of an expandable or contractable material that is expandable or contractable when energized to press the traction surface against the contact surface or retract the traction surface from the contact surface;

the contact surface of the output member and the traction surface each having cooperating helical shapes to convert rotation of the output member into linear motion; and an energy source operatively coupled to the actuator member for sequential energization and actuation of circumferentially spaced portions of the actuator member.

35. The motion producing device of claim 34 in which the expandable or contractable material is a polymer that is expandable or contractable in response to an electric current and the energy source comprises electrodes in contact with the expandable or contractable material.

36. The motion producing device of claim 34 in which the actuator member is formed of at least two segments that are spaced apart axially.

* * * * *